United States Patent
Kondo et al.

(10) Patent No.: US 6,738,516 B1
(45) Date of Patent: May 18, 2004

(54) MONITOR DISPLAY APPARATUS

(75) Inventors: Takashi Kondo, Sakai (JP); Motohiro Nakanishi, Sakai (JP); Hitoshi Hagimori, Nara-ken (JP); Shinichi Ban, Kobe (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/333,995

(22) Filed: Jun. 16, 1999

(30) Foreign Application Priority Data

Jun. 18, 1998 (JP) ............................................. 10-171208
Sep. 30, 1998 (JP) ............................................. 10-276867

(51) Int. Cl.$^7$ ................................................. G06K 9/46
(52) U.S. Cl. ....................................... 382/190; 382/154
(58) Field of Search ................................ 382/100, 103, 382/131, 154, 181, 190, 254, 275, 276, 286, 291, 309, 311; 345/419, 420, 424, 700; 356/12, 14, 601, 602, 603, 608, 611; 378/4

(56) References Cited

U.S. PATENT DOCUMENTS

| 4,821,200 | A |   | 4/1989  | Oberg .......................... 700/182 |
| 4,879,668 | A | * | 11/1989 | Cline et al. ................... 345/424 |
| 5,115,400 | A |   | 5/1992  | Watanabe et al. ............. 700/182 |
| 5,216,616 | A |   | 6/1993  | Masters ........................ 264/401 |
| 5,257,097 | A |   | 10/1993 | Pineau et al. ................. 358/500 |
| 5,452,219 | A |   | 9/1995  | Dehoff et al. ................. 700/163 |
| 5,469,254 | A | * | 11/1995 | Konomura .................. 356/241.1 |
| H1506     | H |   | 12/1995 | Beretta ......................... 345/199 |
| 5,552,992 | A |   | 9/1996  | Hunter ......................... 700/118 |
| 5,553,207 | A | * | 9/1996  | Sekiguchi et al. ............ 345/424 |
| 5,559,712 | A | * | 9/1996  | Kihara et al. ................. 700/118 |
| 5,581,276 | A | * | 12/1996 | Cipolla et al. ................ 345/156 |
| 5,630,034 | A | * | 5/1997  | Oikawa et al. ............... 345/424 |
| 5,631,840 | A |   | 5/1997  | Ooka et al. ................... 700/182 |
| 5,668,631 | A |   | 9/1997  | Norita et al. ................. 356/376 |
| 5,671,056 | A | * | 9/1997  | Sato ............................. 356/602 |
| 5,692,061 | A | * | 11/1997 | Sasada et al. ................ 382/106 |
| 5,724,264 | A |   | 3/1998  | Rosenberg et al. .......... 702/152 |
| 5,736,201 | A |   | 4/1998  | Flint ............................ 427/466 |
| 5,798,924 | A |   | 8/1998  | Eufinger et al. ............. 700/117 |
| 5,818,959 | A | * | 10/1998 | Webb et al. .................. 382/154 |
| 5,819,016 | A | * | 10/1998 | Watanabe et al. ............ 345/419 |
| 5,826,578 | A | * | 10/1998 | Curchod ....................... 600/595 |
| 5,867,592 | A | * | 2/1999  | Sasada et al. ................ 382/154 |
| 5,901,060 | A |   | 5/1999  | Schall et al. .................. 700/98 |
| 5,926,388 | A |   | 7/1999  | Kimbrough et al. ......... 700/118 |
| 6,031,941 | A | * | 2/2000  | Yano et al. ................... 382/276 |

FOREIGN PATENT DOCUMENTS

JP        7-174536        7/1995

OTHER PUBLICATIONS

Tajima, et al "3–D data acquisition by Rainbow Range Finder", IEEE, pp.309–313,1990.*
Dunn, et al. "Measuring the area and volume of the human body with structured light", IEEE, pp. 1350–1364, 1989.*
Basri, et al. "Distance metric between 3d models and 2d images for recognition and classification", IEEE, pp. 465–470, 1996.*
Uchida, et al. "Measuring method of three–dimensional position and orientation of a moving object for medical robots", IEEE, pp. 887–892, 1996.*

* cited by examiner

Primary Examiner—Daniel Mariam
(74) Attorney, Agent, or Firm—Burns, Doane, Swecker & Mathis, L.L.P.

(57) ABSTRACT

An image is displayed on a monitor after recognizing, based on 3-D data obtained by measuring an object in three dimensions, an error region which is an unmeasurable portion of the object in a measured range. A partial image is extracted corresponding to the error region from a 2-D image obtained by imaging the object. Then the partial image is highlighted on the display. This allows the operator to elect to use, or not, the image in forming a 3-D model of the imaged object, e.g., the face of the operator.

25 Claims, 30 Drawing Sheets

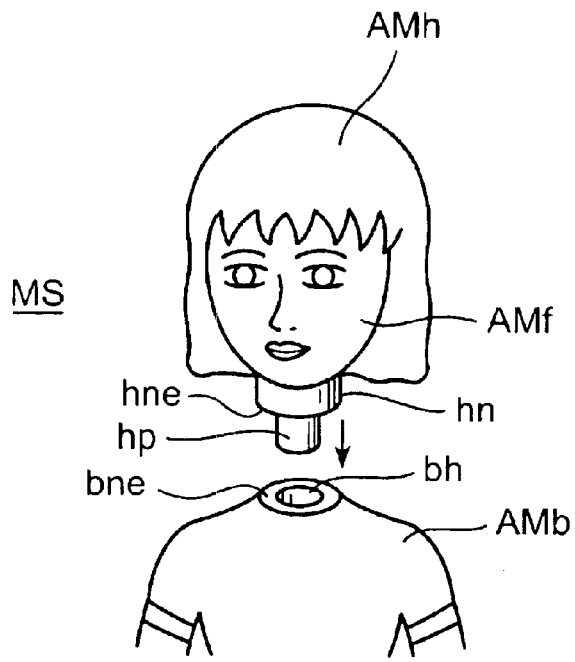
FIG. 18
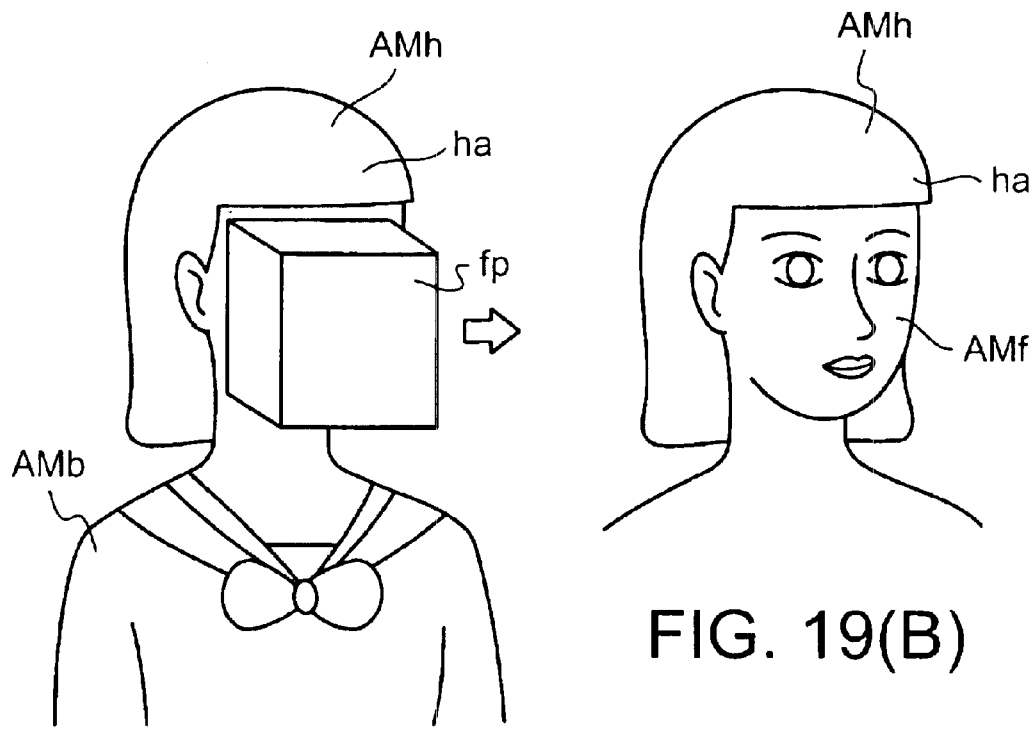
FIG. 19(A)
FIG. 19(B)

MONITOR DISPLAY APPARATUS

Priority is claimed to Japanese Application Nos. 10-171208 and 10-276867 filed in Japan on Jun. 18, 1998 and Sep. 30, 1998, respectively, both of which are herein by reference.

BACKGROUND OF THE INVENTION

1. Field of the Invention

The present invention relates to a monitor display apparatus for non-contacting 3-D measurement and generation of a 3-D model based on the 3-D measurement.

2. Discussion of Related Art

A non-contacting 3-D measuring apparatus termed a "range finder" has been used for inputting data to a CG (computer graphics) system or a CAD (computer aided design) system, human body measurement, visual recognition by a robot, and the like since it can perform higher-speed measurement than a contacting measuring apparatus.

Non-contacting 3-D measurement methods can be subdivided into an active method such as a light chopping method or a pattern projection method and a passive method represented by a stereovisual method. In a light chopping method (also termed slit-light projection method), for example, a slit light beam having a rectilinear cross section is projected as a reference beam on an object such that the slit light beam is polarized and used to scan the object. From the angle at which the slit light beam is projected and the angle at which the slit light beam reflected by the object is incident upon a light receiving surface, the distance between a reflection point on the object and a reference point in the apparatus can be calculated on the principle of triangulation. If the distance is calculated for each pixel on the light receiving surface, a distance image representing the configuration of the object can be obtained.

In accordance with any of the foregoing various measurement methods, a part of the target object cannot be measured depending on the configuration of the object or on the positional relationship between the object and the measuring apparatus. When an object having a highly irregular configuration is measured in the active method, a shaded portion is produced in a region observed from the light receiving surface, and the shaded portion is unmeasurable because the reference beam is not projected thereon. Even when the highly irregular object is measured in the passive method, a portion observable only with either of right and left image pickup devices is produced, which is also unmeasurable.

Depending on the position and size of such an unmeasurable portion (referred to as an "error region"), there may be cases where measurement should be performed again. However, the conventional measurement methods have the problem that, even when the measurer views the distance image monitored on the display disposed in the measuring apparatus or connected thereto as an external device, it is difficult for the measurer to recognize the position and size of the error region. In some instances, the measurer recognizes the error region only after a surface model was produced based on measurement data. If considerable time has elapsed from the measurement, the target object may not be on the spot of measurement when measurement is to be performed again.

SUMMARY OF THE INVENTION

It is therefore an object of the present invention to facilitate the recognition of the error region on the target object in 3-D measurement.

To achieve this and other objects, the present invention can be embodied as an apparatus which includes a display for displaying an image; means for recognizing, based on 3-D data obtained by measuring an object in three dimensions, an error region which is an unmeasurable portion of the object in a measured range; means for extracting a partial image corresponding to the error region from a 2-D image obtained by imaging the object; and display control means for displaying a monitor image representing at least the size and position of the partial image on the display.

According to this invention, it becomes possible to easily recognize the error region on the target object in 3-D measurement.

The display control means can display the monitor image obtained by performing specific image processing with respect to the partial image.

The display control means can display the 2-D image with the partial image being enhanced as the monitor image.

Additionally, the present invention an be embodied as an apparatus which includes a display for displaying an image; means for recognizing, based on 3-D data obtained by measuring a head in three dimensions, an error region which is an unmeasurable portion of the head; and display control means for displaying, on the display, a 2-D image obtained by shooting the head after performing specific image processing with respect to a region thereof corresponding to skin which is also a portion corresponding to the error region.

Such processes as error region recognition, partial image extraction, and image processing can be performed by either a hardware circuit using various electronic devices or a function implemented by a computer or microprocessor for executing a program, or varying combinations of both. It is sufficient for the target object to be present at the time of 3-D measurement. The object may be a human face, a human head, another human body part, a living thing other than a human, or a nonliving thing. It is sufficient for the 3-D data to specify the configuration of the portion of the object other than the error region such that it is reproducible. The 3-D data may be a distance image, a variety of models in 3-D configurations, or a measurement original data forming a base for distance calculation. Although the 2-D image is preferably a color image, it presents no obstacle to the display of an error even if the 2-D image is a monochrome image. As examples of the image processing performed with respect to the partial image or the like, there are solid painting in a specific color, pattern painting, contouring, and the like. As examples of enhancement, there are color change, solid painting, brightness change, flashing, and the like.

According to the invention recited, it becomes possible to prevent, in displaying a 2-D image obtained by shooting the head, the portion of the error region that can be recovered in 3-D measurement from being displayed. As a result, only an intrinsic error region can be recognized.

BRIEF DESCRIPTION OF THE DRAWINGS

The present invention will now be described by way of exemplary embodiments, to which it is not limited, as shown in the accompanying drawings in which:

FIG. 18 is a view showing processed head material to be joined with processed body material;

FIGS. 19a and 19b are drawings showing a difference between pre-processing configuration of the head material and post-processing configuration of the head material;

DETAILED DESCRIPTION OF THE INVENTION

Figure 1:
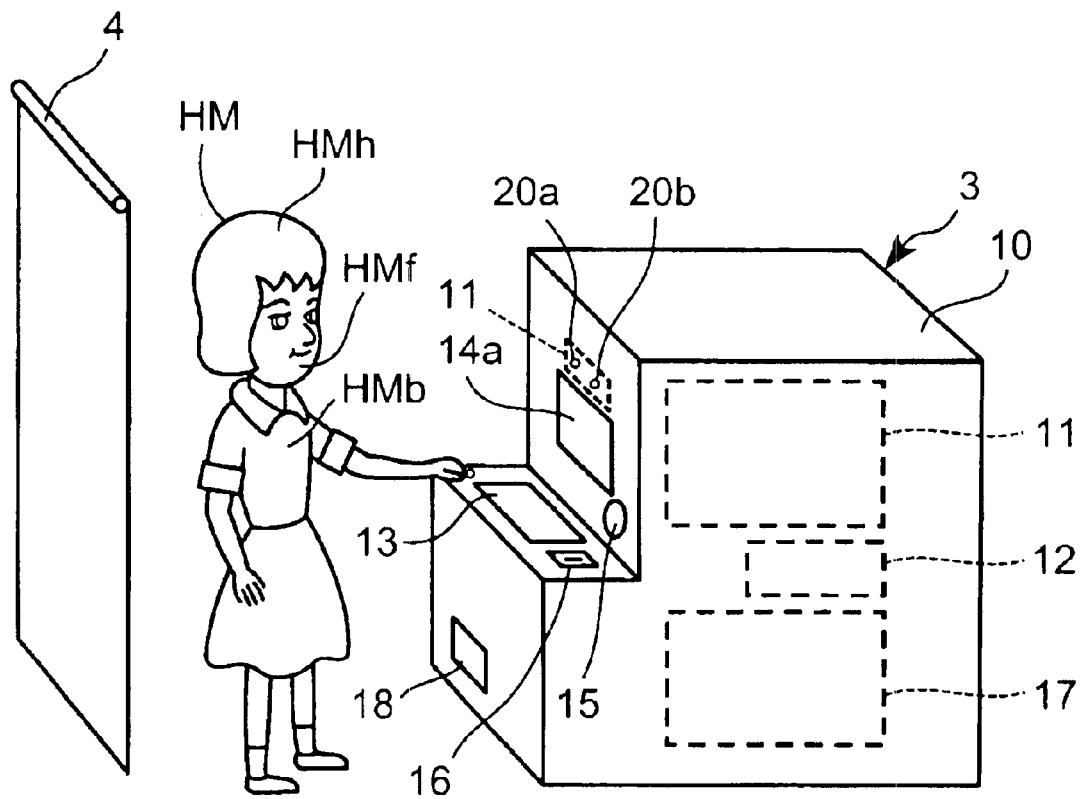
FIG. 1 is an external view of a human body modeling system according to the present invention.

With reference to FIG. 1, the human body modeling system 1 is a system for measuring, in three dimensions, the configuration of a head HMh of an operator HM who is both a user customer and a target object to be measured. The human body modeling system automatically processes a material on the spot based on the result of measurement, and producing for sale a three-dimensional model (human body model) MS imitating the face of the operator HM. The operator HM can obtain the three-dimensional (human body model) MS by inserting a coin into the system and performing a necessary operation, for example.

Figure 2:
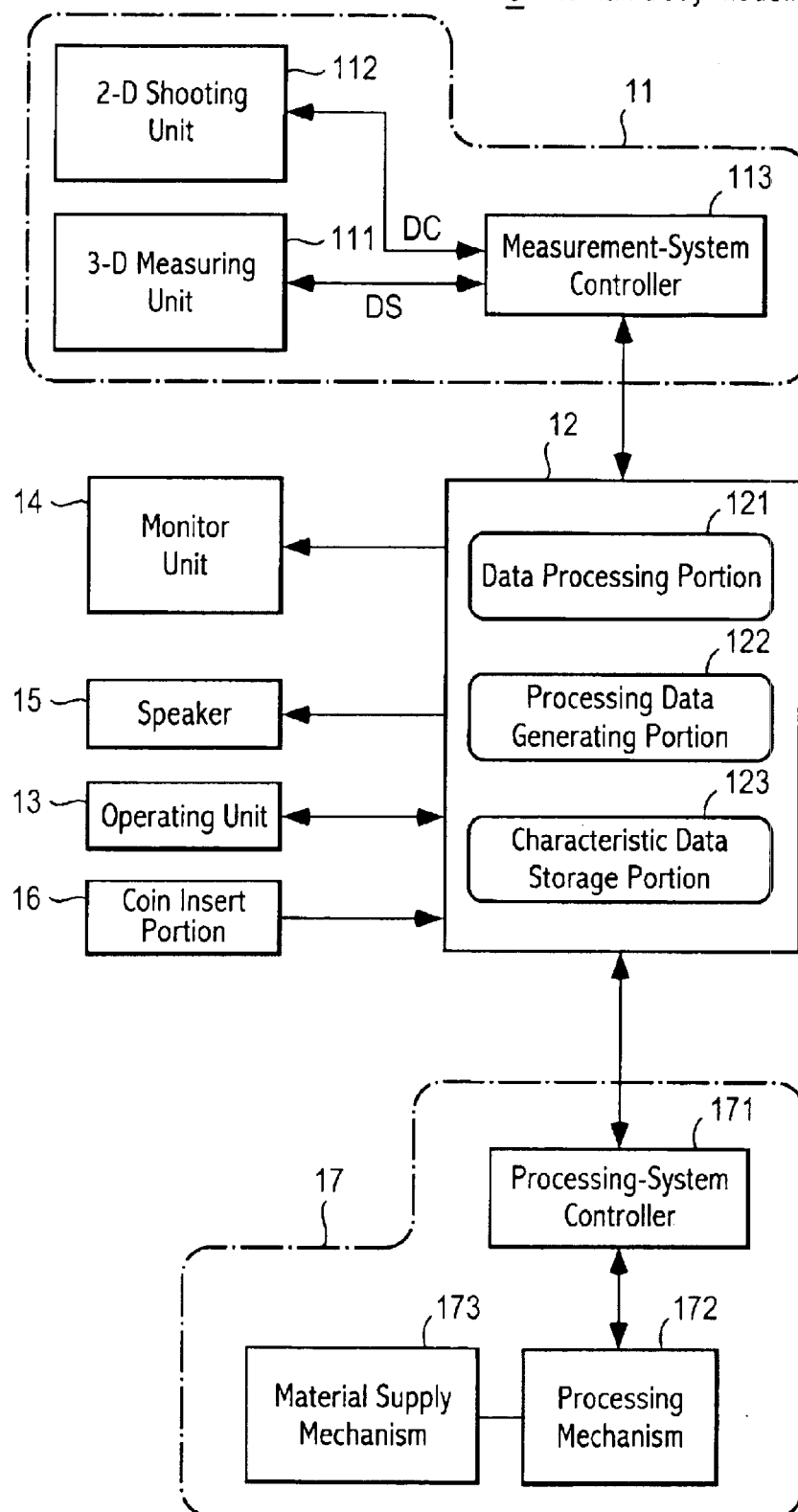
FIG. 2 is a block diagram showing a structure of a human body modeling apparatus.

In FIGS. 1 and 2, the human body modeling system 1 comprises the human body modeling apparatus 3 and a background screen 4 as a background wall. The background screen 4 is blue and disposed as a background behind the operator HM.

The human body modeling apparatus 3 is composed of: a measuring unit 11; an operating unit 13; a monitor unit 14; a speaker 15; a coin insert portion 16; a processing unit 17; and a discharge portion 18. These components are entirely disposed in a main body case 10 or some of them are attached to the main body case 10 to be exposed on the surface thereof.

The measuring unit 11 consists of: a 3-D measuring unit 111 a 2-D imaging or shooting unit 112; and a measurement-system controller 113. The 3-D measuring unit 111 is for shooting the head HMh, particularly the face HMf, of the operator HM to obtain 3-D data DS. The 2-D shooting unit 112 is for shooting the entire head HMh of the operator and a part of the body HMb thereof to obtain 2-D data (color image data).

The 3-D measuring unit 111 has a light projecting window 20a for projecting a reference beam and a light receiving window 20b for receiving the reflected reference beam. The 2-D shooting unit 112 also uses the light receiving window 20b. The light projecting window 20a and the light receiving window 20b are laterally arranged in the front face of the main body case 10 along the upper edge of a display surface 14a of the monitor unit 14 with a spacing corresponding to the length of a base line therebetween.

The 3-D measuring unit 111 is capable of measuring in three dimensions a target object to be measured within a given range of distance from the light projecting window 20a and from the light receiving window 20b. Such a measurable range of distance is termed a measurable distance range. In short, normal 3-D data can be obtained from the object if it is located within the measurable distance range and 3-D data cannot be obtained from the object if it is located outside the measurable distance range because it is unmeasurable. The measurable distance range is designated at "d'" in FIG. 4. The measurable distance range is dependent on the number of pixels in a shift direction on an effective light receiving area Ae of an image pickup surface S2, which will be described later, and on the reach of the reference beam.

The human body modeling system 1 is so designed that the operator HM is within the measurable distance range as long as the operator HM is in a normal position where he can operate the operating unit 13, which allows normal measurement for obtaining 3-D data. However, if the operator HM is not within the measurable distance range, e.g., if the operator HM is too far away, the operator HM is prompted to move closer. It is to be noted that the background screen 4 is disposed outside the measurable distance range, as will be described later.

A slit light beam (a linear laser beam with a specified width w) U emitted from an optical unit of the measuring unit 11 passes through the light projecting window 20a toward the operator HM. The projection angle lengthwise of the slit beam is fixed. A part of the slit light beam reflected by a surface of the operator HM passes through the light receiving window 20b to be incident upon the optical unit.

The measurement-system controller 113 controls the 3-D measuring unit 111 and the 2-D shooting unit 112 and processes data obtained therefrom to calculate 3-D data and 2-D data.

In the control unit 12, there are provided a data processing portion 121, a processing data generating portion 122, and a characteristic data storage element 123. The control unit 12 controls the processing unit 17 based on the 3-D data and 2-D data obtained by the measuring unit 11 such that the processing unit 17 performs processing with respect to a supplied material to produce the three-dimensional model of the operator HM. The control unit 12 also displays the 2-D image (color image) of the imaged operator HM for checking on the monitor element 14. The control unit 12 further cautions the operator HM with a display on the monitor 14 or a voice prompt from the speaker 15 if his seating or face orientation is improper. The control unit 12 furthermore switches the operational mode in response to an instruction from the operating unit 13, thus controlling the entire human body modeling apparatus 3. The control unit 12 will be described later in greater detail by using flow charts. The control unit 12 can be implemented by either a hardware circuit of various electronic devices or a function implemented by a computer or microprocessor for executing a program, or varying combinations of both.

Figure 3:
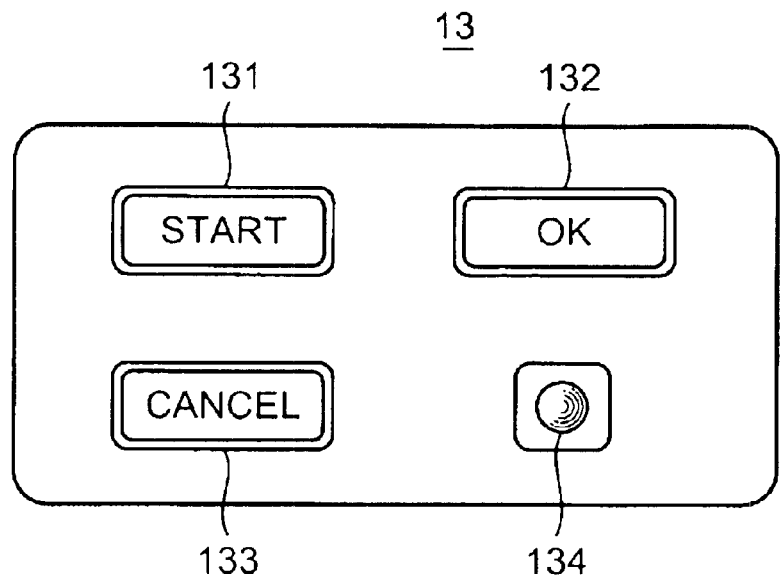
FIG. 3 is a front view showing an operating unit.

As shown in FIG. 3, the operating unit 13 is provided with: a start button 131; a confirm button (also termed as an OK button) 132; a cancel button (also termed as a NG button) 133; and a joystick 134. The confirm button 132 is pressed, e.g., to give an O.K. on a check screen or menu displayed on the monitor 14. The cancel button 133 is pressed for another posing when the image of the operator HM displayed on the monitor unit 14 is different from his expectations. The joystick 134 is used to select any of a plurality of buttons displayed on the display surface 14a, GUI, and the like and to rotate the image displayed on the display surface 14a in various 3-D directions. After a selection is made by using the joystick 134, a direction to the selection is inputted by pressing, e.g., the confirm button 132.

The monitor unit 14 is a display system having the display surface 14a located at the near center of the front face of the main body case 10 in opposing relation to the operator HM such that the operator HM views the display surface 14a in front. The monitor unit 14 is composed of a display unit having a display device such as a CRT, LCD, or PDP with or without an additional optical mechanism. The structure of the monitor unit 14 is the simplest when the display portion of the display device coincides with the display surface 14a. If the monitor unit 14 is so constructed that the display device is positioned posterior to the display surface 14a and a transparent glass plate is fitted in the display surface 14a, a mirror or half mirror can be disposed therebetween. In the case where a half mirror is disposed anterior to the display surface of the display device, in particular, the display device should be disposed posterior to the display surface 14a, as in a variation, which will be described later. In this case, the display surface 14a is synonymous with a mere display window. Even when the display surface 14a is a mere display window, however, such an expression as "displayed on the display surface 14a" will be used in the present specification, since the operator HM views the image through the display surface 14a.

The display surface 14a displays a 2-D image based on which the operator HM determines a composition, a 3-D image (image in a 3-D configuration) resulting from the 3-D measurement performed with respect to the operator HM, a button or GUI (Graphical User Interface) for operation, instructions, cautions, or the like about an operating procedure.

From the speaker 15, instructions for the operation of the human body modeling apparatus 3, directions for the use thereof, cautions about the shooting position and condition of the operator HM, and the like are given by voice. Optionally, an effect sound is produced or music is played. Although the speaker 15 is disposed on the front face of the main body case 10, it may also be disposed on the side face, top face, or bottom face of the main body case 10 instead.

The coin insert portion 16 is for accepting a charge for the use of the human body modeling system 1, which is inserted therein by the operator HM. A return button is provided for a return of the coin. When a real coin is inserted, a signal indicative of the insertion of the real coin is outputted to the control unit 12, which initiates the operation for the production of the three-dimensional model MS.

The processing unit 17 is provided with: a processing-system controller 171; a processing mechanism 172; and a material supply mechanism 173. The material supply mechanism 173 selects, from a plurality of materials, requested ones under the direction of the processing-system controller 171 and supplies the selected materials to the processing mechanism 172. The processing mechanism 172 processes a part of the supplied materials into the face HMf of the operator HM under the control of the processing-system controller 171. If required, a plurality of materials or the processed materials are joined to produce the three-dimensional model MS of the operator HM. Since the three-dimensional model MS produced is discharged from the discharge portion 18, the operator HM himself retrieves it from the discharge portion 18. As for respective control ranges covered by the control unit 12 and the processing-system controller 171, they can be embodied in various forms.

Figure 4:
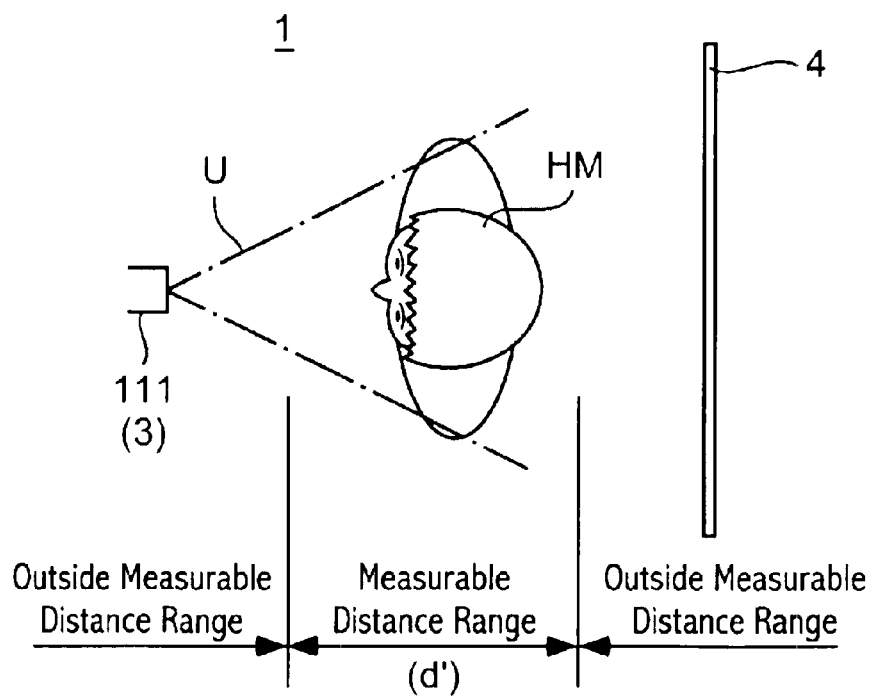
FIG. 4 is a view showing the position of a background screen.

Although the background screen 4 is blue and disposed as a background behind the operator HM, as described above, it is positioned posterior to the operator HM and outside the measurable distance range covered by the 3-D measuring unit 111 when viewed from the human body modeling apparatus 3, as shown in FIG. 4. As for the size of the background screen 4, it is sufficient to cover each of the respective shooting ranges of the 3-D measuring unit 111 and the 2-D shooting unit 112, i.e., substantially the entire region covering the respective fields of view of a measurement sensor 53 and a color sensor 54. The 2-D shooting unit 112 is also capable of normally imaging not only the operator HM but also the background screen 4 to provide color image data.

When the measuring unit 11 performs shooting, therefore, the 3-D data on the operator HM and the 2-D data on the operator HM and on the background screen 4 is obtained. That is, when the 3-D measuring element 11 performs measurement, the 3-D data is obtained only from the operator HM since the background screen 4 is positioned outside the measurable distance range. The 3-D data cannot be obtained from the portion of the background screen 4, resulting in error data.

Since the background screen 4 is blue, it shows an extremely low reflectance with respect to light at the wavelengths of the reference beam radiated from the 3-D measuring unit 111, which prevents the reception of a sufficient quantity of light required for 3-D measurement. Hence, the very fact that the background screen 4 is blue makes it impossible to obtain the 3-D data on the portion of the background screen 4, so that the 3-D data only on the operator HM is obtained. Accordingly, the 3-D measuring unit 111 obtains the 3-D data only on the operator HM even when the background screen 4 is positioned within the measurable distance range.

Even if the reflected reference beam is received by the 3-D measuring unit 111, the reflectance of the background screen 4 with respect to light at the wavelengths of the reference beam is sufficiently low provided that it can be judged to be unmeasurable in accordance with a routine for calculating a 3-D position (FIG. 30), which will be described later. For example, it is on such an order that it is judged to be No in Step #111. In this case, there is no more restraint on the position of the background screen 4. Since the 2-D data is obtained from the entire shooting range, various image analyses can be performed based on the 2-D data obtained.

A description will be given to the structure and operation of the measuring unit 11.

Figure 5:
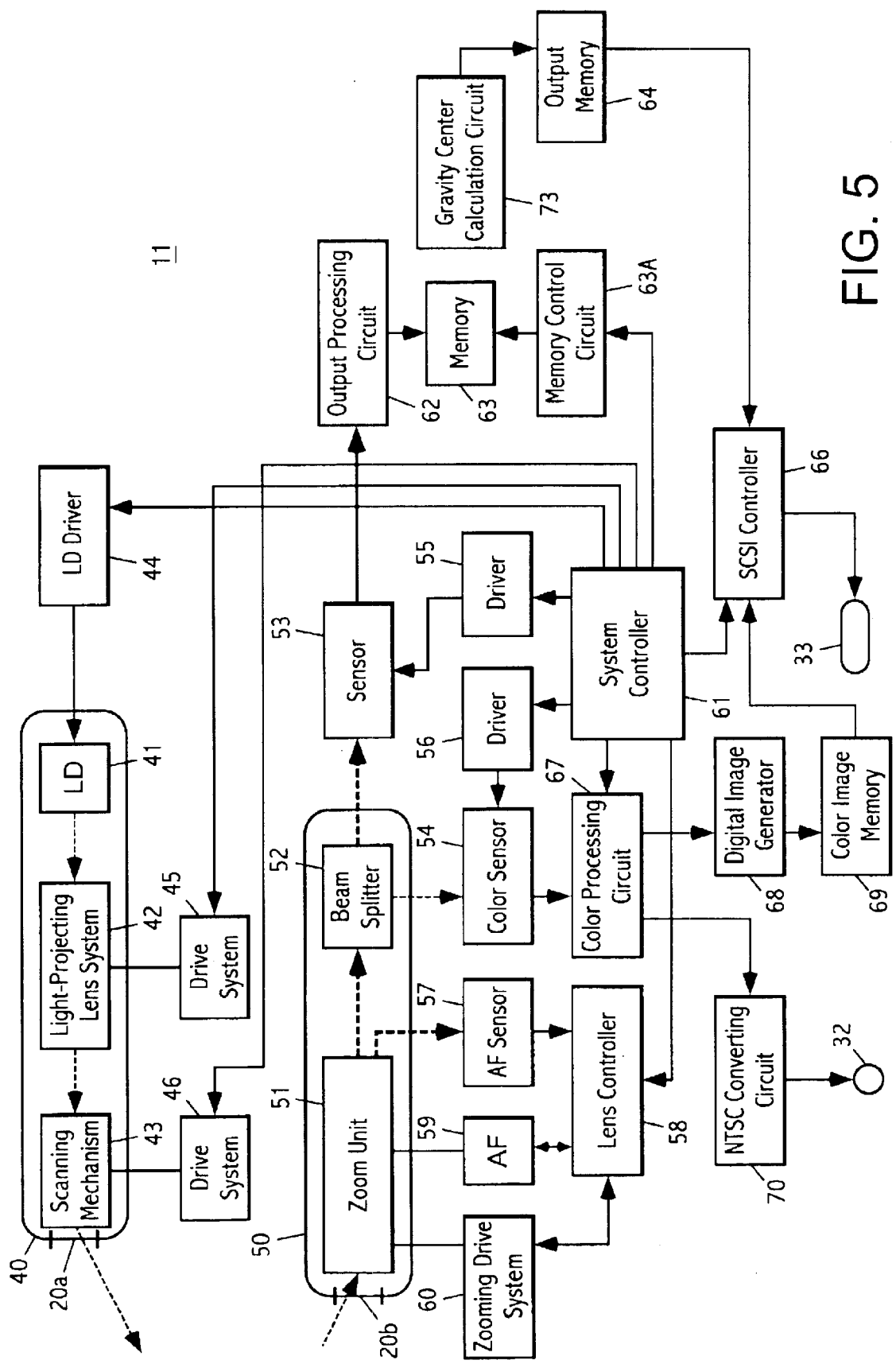
FIG. 5 is a block diagram showing a functional structure of a measuring unit.
Figure 6:
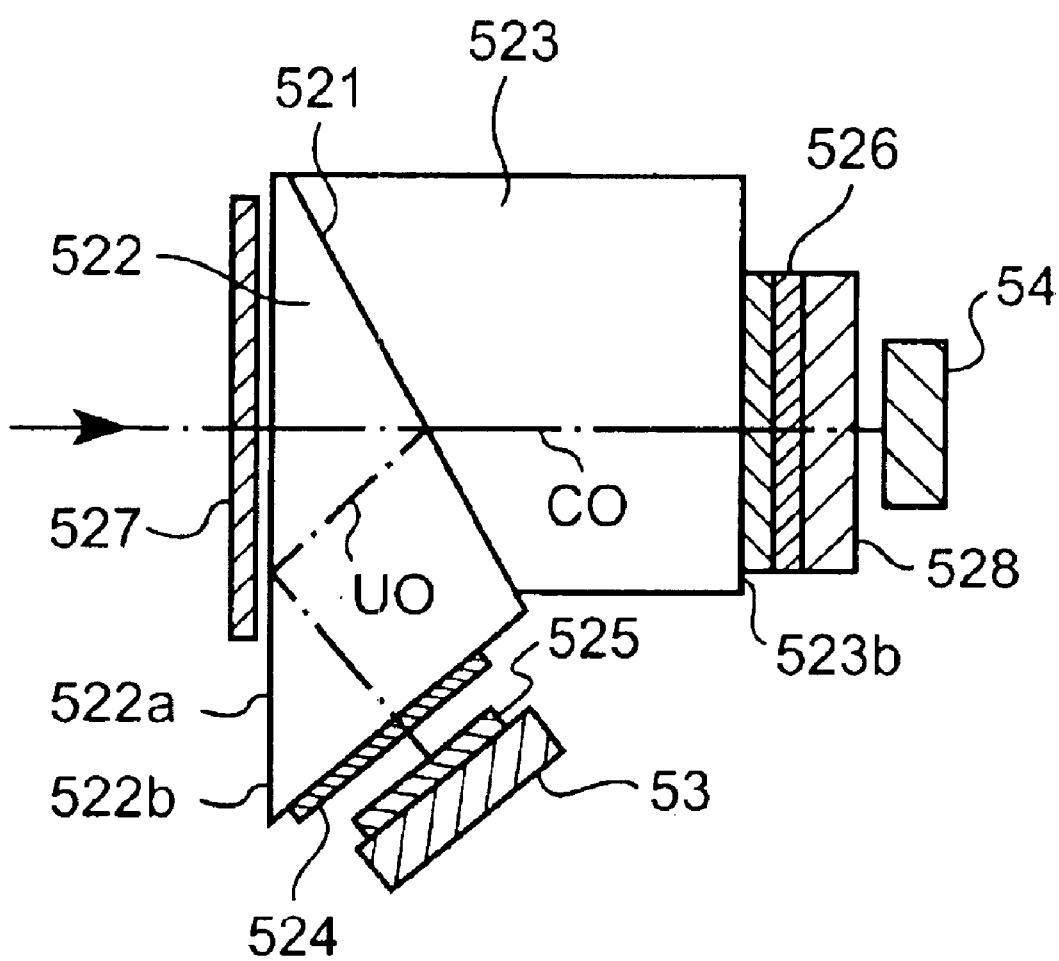
FIG. 6 is a view diagrammatically showing respective structures of a beam splitter and a sensor.

FIG. 5 is a block diagram showing the functional structure of the measuring unit 11. FIG. 6 is a view diagrammatically showing the respective structures of a beam splitter 52 and the sensors 53, 54. In FIG. 5, the solid arrow indicates the flow of an electric signal and the broken line indicates the flow of light.

In FIG. 5, the measuring unit 11 has two optical systems 40, 50, that are the light-projecting optical system and light-receiving optical system composing the optical unit. In the optical system 40, a laser beam at a wavelength of 670 nm emitted from a semiconductor laser (LD) 41 becomes the slit light beam U after passing through the light-projecting lens system 42, which is polarized by a galvanometer mirror (scanning mechanism) 43. The system controller 61 controls a driver 44 of the semiconductor laser 41, a drive system 45 of the light-projecting lens system 42, and a drive system 46 of the galvanometer mirror 43.

In the optical system 50, the beam splitter 52 splits the light beam condensed by a zoom unit 51. A light beam at the oscillation wavelengths of the semiconductor laser 41 is incident upon the measurement sensor 53. A light beam in the visible band is incident upon the color sensor 54 for monitoring. Each of the sensor 53 and the color sensor 54 is a CCD area sensor. The zoom unit 51 is of internal focusing type and a part of the incident light beam is used for auto-focusing (AF). An AF sensor 57, a lens controller 58, and a focusing drive system 59 implement the AF function. A zooming drive system 60 is provided for electromotive zooming.

Picked-up image data obtained by the sensor 53 is stored in a memory 63 in synchronization with a clock from a driver 55. The picked-up image data obtained by the color sensor 54 is transferred to a color processing circuit 67 in synchronization with a clock from a driver 56. The picked-up image data subjected to color processing is outputted on line through an NTSC converting circuit 70 and an analog output terminal 32 or quantized by a digital image generator 68 to be stored in a color image memory 69. After that, the color image data is transferred from the color image memory 69 to the SCSI controller 66 and outputted on line from the digital output terminal 33. It is to be noted that the color image is an image at the same angle of view as a distance image obtained by the sensor 53. The color image is used in the control unit 12 to detect the condition of the operator HM and also to, e.g., remove unwanted vertices from a model in a 3-D configuration.

An output processing circuit 62 has an amplifier for amplifying photoelectric conversion signals representing respective pixels g outputted from the sensor 53 and an A/D converter for converting each of the photoelectric conversion signals to 3-bit received light data. The memory 63 is a readable/writable memory having a storage capacity of 200×32×33 Bytes and stores the received light data outputted from the output processing circuit 62. A memory control circuit 63A specifies an address in the memory 63 to which a write/read operation is to be performed.

A gravity center calculating circuit 73 calculates data forming a basis for calculating 3-D data based on the received light data stored in the memory 64 and outputs the data to an output memory 64. As for the structure and operation of the gravity center calculating circuit 73, they will be described later in greater detail.

In FIG. 6, the beam splitter 52 consists of: a color separation film (dichroic mirror) 521; two prisms 522, 523 having the color separation film 521 interposed therebetween; an infra-red cut filter 524 disposed on an emitting surface 522b of the prism 522; a visible cut filter 525 disposed on the front surface of the sensor 53; an infra-red filter 526 disposed on an emitting surface 523b of the prism 523; and low-pass filters 527, 528.

The slit light beam UC from the zoom unit 51 is incident upon the color separation film 521 through the low-pass filter 527 and the prism 522. A light beam U0 at the oscillation wavelengths of the semiconductor laser 41 is reflected by the color separation film 521, reflected by the incident surface 522a of the prism 522, and emitted from the emitting surface 522b thereof toward the sensor 53. Of the light beam U0 emitted from the prism 522, a light beam transmitted by the infrared cut filter 524 and by the visible cut filter 525 (slit light) is received by the sensor 53. On the other hand, a light beam C0 transmitted by the color separation film 521 passes through the prism 523 and is emitted from the emitting surface 523b toward the color sensor 54. Of the light beam C0 emitted from the prism 523, a light beam passing through the infra-red cut filter 526 and the low-pass filter 528 is received by the color sensor 54.

Thus, in the present embodiment, a normal visible light beam and the slit light beam U are incident upon the same light receiving window 20b and then split by the beam splitter 52, so that the shooting of a 2-D image and the measurement for 3-D data are performed from the same viewpoint.

Next, a description will be given to the method of calculating 3-D data performed by the measuring unit 11.

Figure 7A:
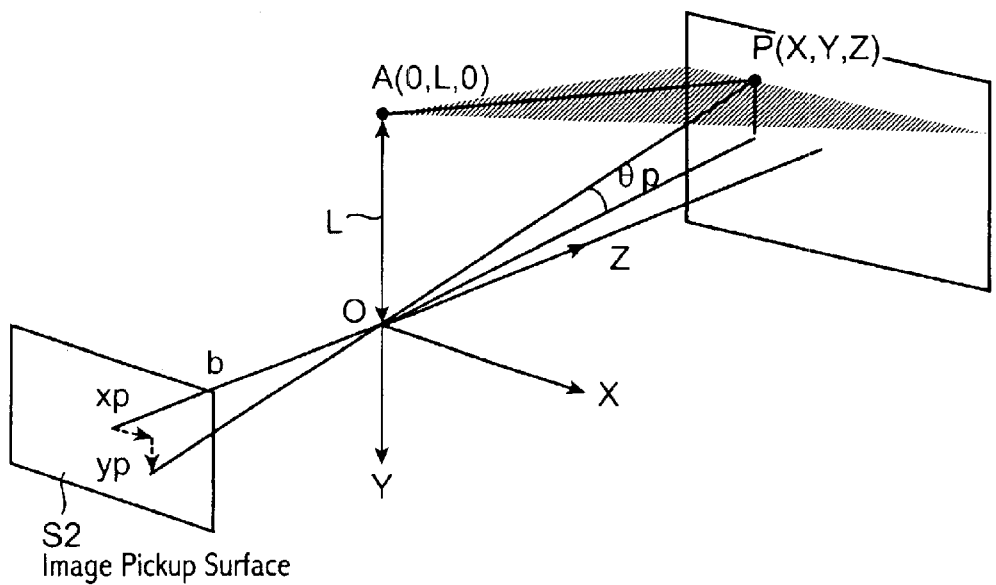
FIGS. 7a, 7b and 7c are diagrams illustrating the principle of 3-D measurement performed by the measuring unit.
Figure 7B:
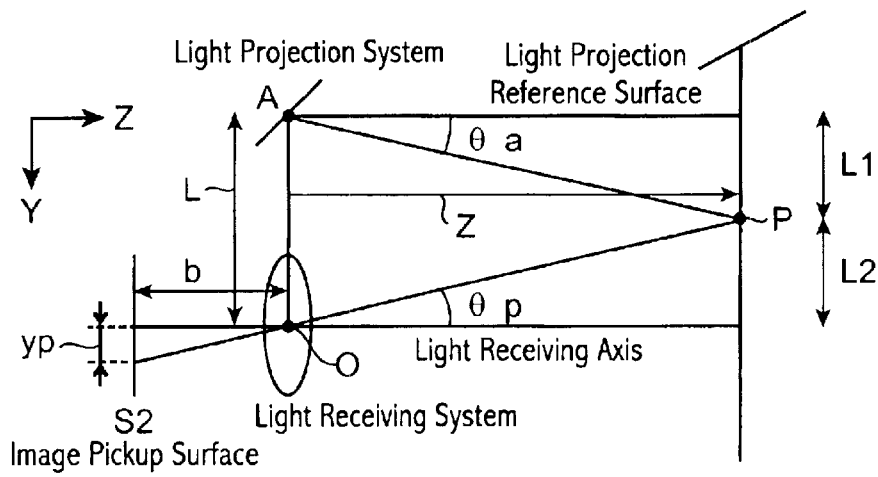
Figure 7C:
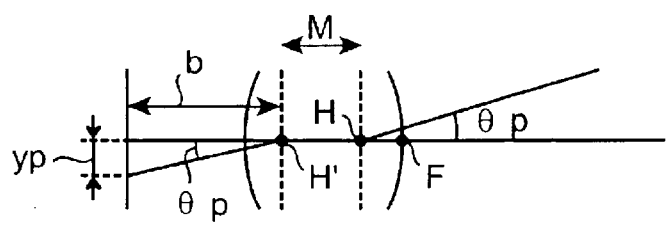
Figure 8A:
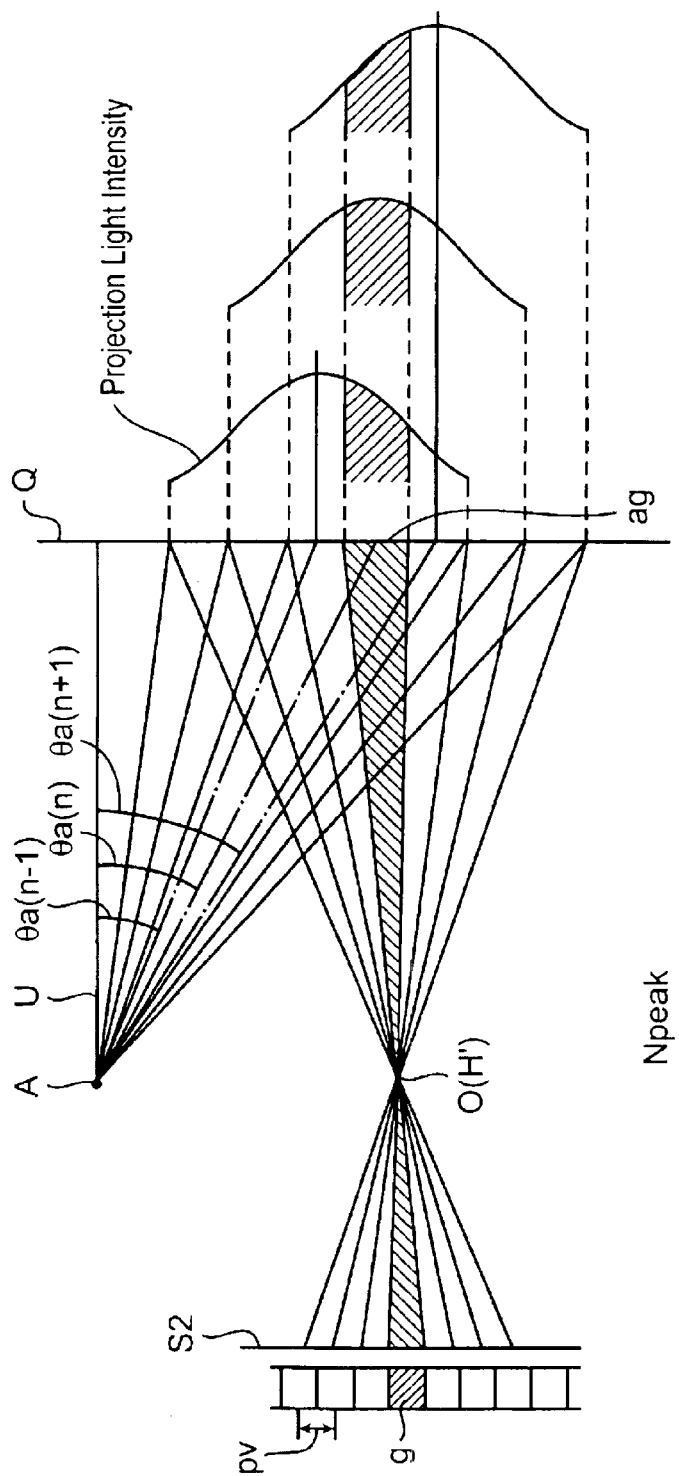
FIGS. 8a and 8b are graphs illustrating the principle of 3-D data calculation in the measuring unit.
Figure 8B:
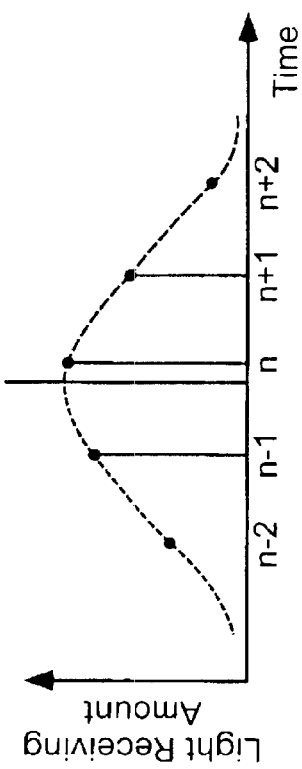

FIGS. 7a, 7b and 7c are diagrams illustrating the principle of 3-D measurement performed by the measuring unit 11. FIGS. 8a and 8b are graphs illustrating the principle of 3-D data calculation in the measuring unit 11. For the sake of clarity, FIGS. 8a, and 8b show only five sessions of sampling the quantity of received light.

In FIGS. 7a, 7b and 7c, the light projecting system and the light receiving system are positioned such that a base line AO connecting a starting point A for light projection and a principal point O is perpendicular to an acceptance axis. width corresponding to five pixels. In FIG. 8, the slit light U is downwardly deflected to shift by a 1 pixel pitch pv on the image pickup surface S2 in every sampling cycle, so that the object Q is scanned with the deflected slit light beam U. In every sampling cycle, received light data (photoelectric conversion data) for one frame is outputted from the sensor 53. It is to be noted that the deflection is actually performed at a conformal velocity.

If attention is given to one pixel g on the image pickup surface S2, the present embodiment obtains thirty-two items of received light data through thirty-two sessions of sampling performed during scanning. By performing gravity center calculation with respect to the thirty-two items of received light data, timing (temporal gravity center Npeak or gravity center ip) with which the optical axis of the slit light beam U passes through the surface area ag of the object within sight of the target pixel g is calculated.

In the case where the surface of the object Q is flat and no noise is caused by the characteristics of the optical system, the quantity of light received by the target pixel g is increased at the timing of the passage of the slit light beam U and generally presents a nearly normal distribution, as shown in FIG. 8(b). In the case where the quantity of received light is maximal at the timing between the n-th sampling and the preceding (n−1)-th sampling, as shown in FIG. 8(b), the timing almost coincides with the temporal gravity center Npeak.

The position (coordinates) of the object Q will be calculated based on the relationship between the direction in which the slit light beam is radiated and the direction in which the slit light beam is incident upon the target pixel at the calculated temporal gravity center Npeak. This allows the measurement of resolution higher than the resolution defined by the pixel pitch pv on the image pickup surface.

It is to be noted that the quantity of light received by the target pixel is dependent on the reflectance of the object Q. However, the relative ratio between The acceptance axis is perpendicular to the image pickup surface S2. In the case of providing a set of zoom lenses in the light receiving system, as shown in FIG. 7(c), the principal point O becomes a posterior principal point H'.

In 3-D measurement based on the slit-light projection method, the 3-D position of a point P on a target object to be measured is calculated based on the relationship between the direction in which a reference beam is radiated from the 3-D measuring unit 111, i.e., a projection angle Θa and the direction in which light is incident upon the 3-D measuring unit 111, i.e., an acceptance angle Θp.

The projection angle Θa is calculated based on a deflection angle of the slit light beam U. A variation in deflection angle is calculated based on angular velocity and elapsed time. Accordingly, a deflection angle of the slit light U at a given time is calculated based on a deflection angle (the position of the origin) at a time at which deflection is initiated, an angular velocity, and time (measurement timing) elapsed from the initiation of deflection. These physical quantities can be obtained from a drive signal or positional signal from the scanning means, the clock signals for control, a sampling signal for measurement, or an internal clock.

The acceptance angle Θp is calculated based on a light receiving position (yp) on the image pickup surface. In the case of using image pickup means having an image pickup surface composed of a finite number of pixels such as a CCD sensor, the light receiving position on the image pickup surface primarily becomes the position of any pixel and accuracy is determined by a pixel pitch.

To increase the accuracy, interpolation is performed. For interpolation, a gravity center is calculated. As a method of interpolation, i.e., as a method of calculating a gravity center, a method of calculating a temporal gravity center or a method of calculating a spatial gravity center is used.

In FIG. 8, the object Q is irradiated with the slit light beam U which is comparatively wide to correspond to a plurality of pixels on the image pickup surface S2 of the sensor 53. Specifically, the slit light beam U is assumed to have the quantities of light received in the respective sessions of sampling is constant irrespective of the absolute quantity of received light. In other words, the measurement accuracy is unaffected by the color gradation of the object.

Figure 9:
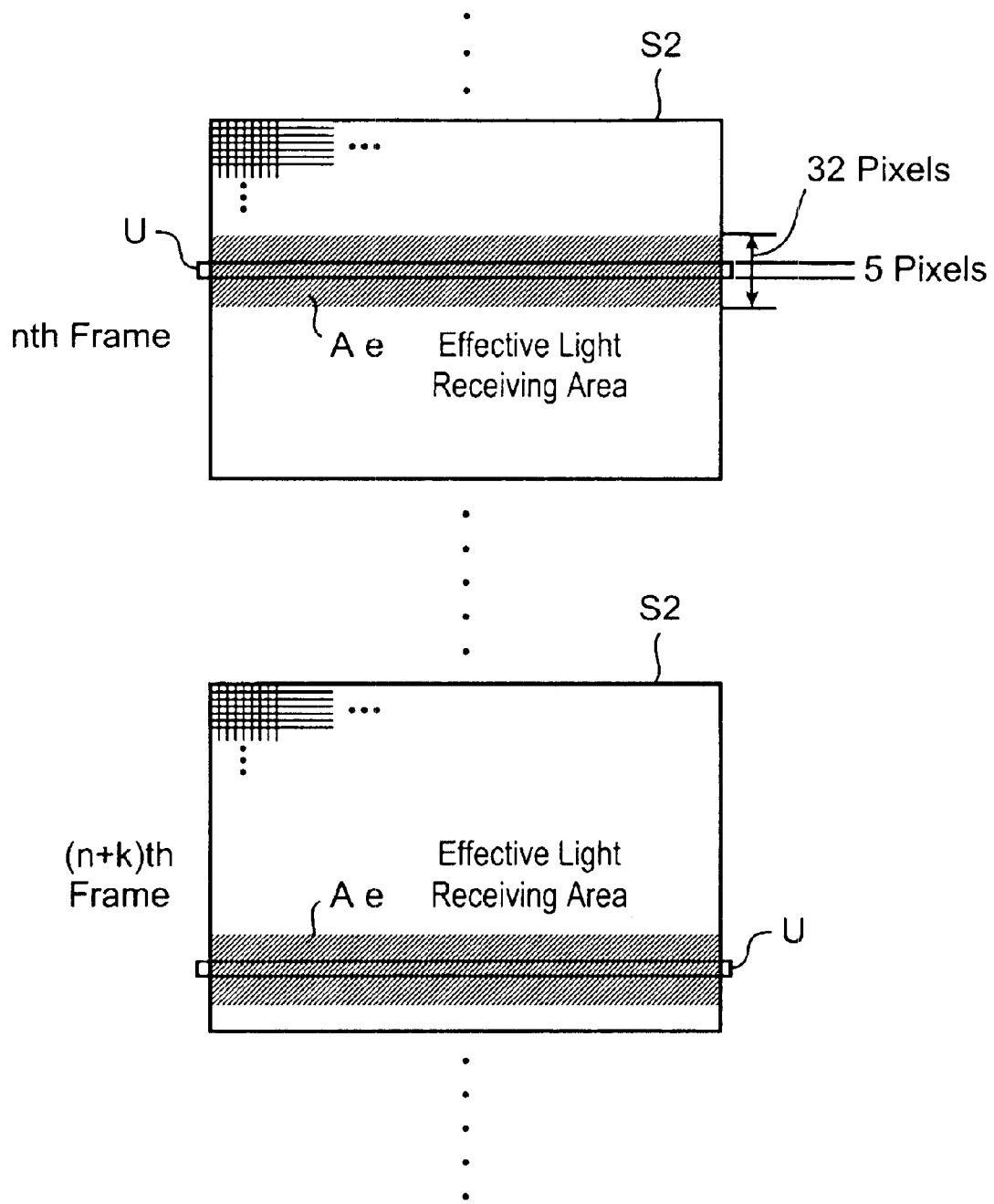
FIG. 9 is a view showing a range within which the sensor reads an image.

FIG. 9 is a view showing a range within which the sensor reads an image.

As shown in FIG. 9, the reading of one frame by the sensor 53 is performed only with respect to the effective light receiving area (rectilinear image) Ae which is a part of the image pickup surface S2, not with respect to the entire image pickup surface S2, thereby achieving high-speed operation. The effective light receiving area Ae is a region of the image pickup surface S2 corresponding to the measurable distance range for the object Q at a certain time at which the slit light beam U is radiated, which shifts by one pixel for each frame with the deflection of the slit light beam U. In the present, exemplary embodiment, the number of pixels in the direction in which the effective light receiving area Ae shifts is fixed to 32. Japanese Unexamined Patent Publication HEI No. 7-174536 discloses a technique for reading only a part of an image shot by a CCD area sensor.

FIG. 10 is a view showing the relationship between a line and a frame on the image pickup surface S2 of the sensor 53.

Figure 10A:
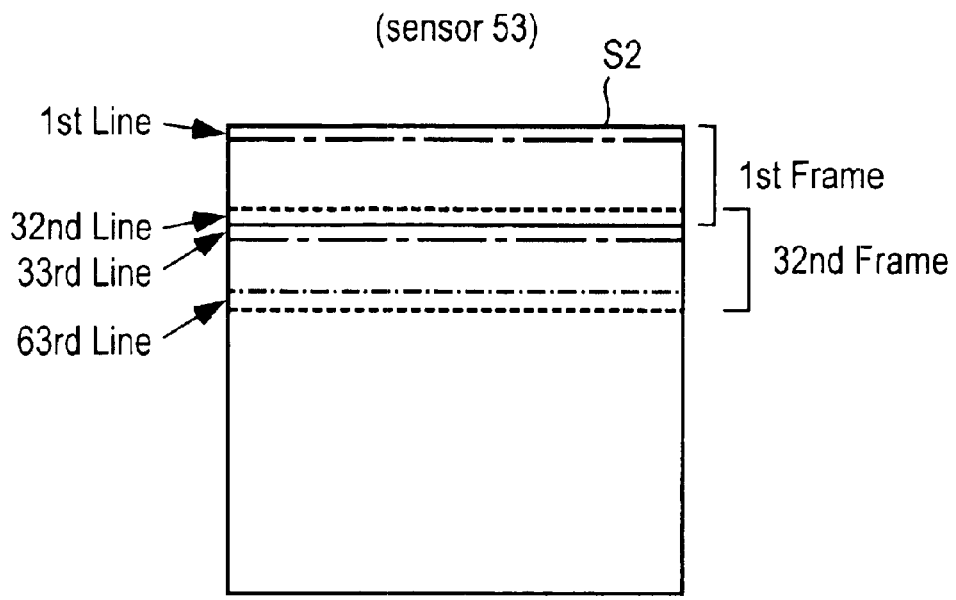
FIGS. 10a and 10b are diagrams showing the relationship between a line and a frame on the image pickup surface of the sensor.
Figure 10B:
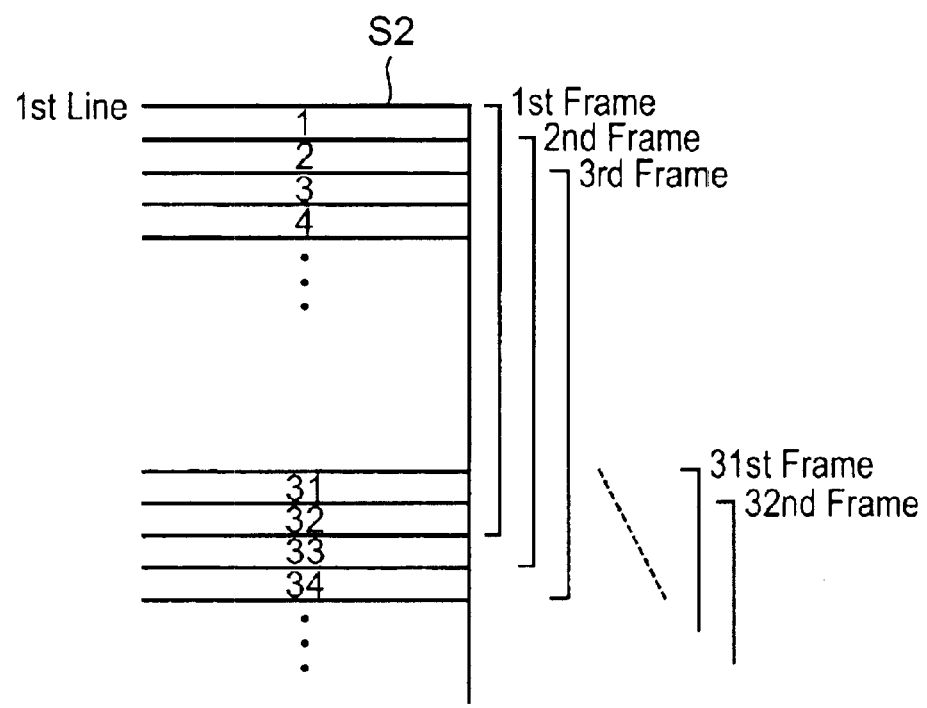

As shown in FIGS. 10(a) and 10(b), a first frame 1 on the image pickup surface S2 contains received light data on 32 (lines 1 to 32)×200 pixels. As the frame number increases by one, one in such a manner that the frame 2 corresponds to the lines 2 to 33 and the frame 3 corresponds to the lines 3 to 34 shifts the corresponding lines. Accordingly, the frame 32 corresponds to the lines 32 to 63. As stated previously, each of the lines is assumed to have 200 pixels.

The received light data on the frames 1 to 32 is sequentially transferred to the memory 63 via the output processing circuit 62 and stored in the order of the frames 1, 2, 3, . . . The data on the line 32 contained in each frame, which is the 32nd line in the frame 1 and the 31st line in the frame 2, is upwardly shifted by one line as the frame number increases by one. When the received light data covering the frames 1 to 32 is stored in the memory 63, the temporal gravity center Npeak is calculated for each of the pixels in the line 32.

While calculation is performed for the line 32, the received light data on the frame 33 is transferred to the memory 63 and stored therein. The received light data on the frame 33 is stored in a region of the memory 63 subsequent to the region thereof for the frame 32. When the data on the frame 33 is stored in the memory 63, the temporal gravity center Npeak is calculated for each of the pixels in the respective lines 33 contained in the frames 2 to 33.

While calculation is performed for the line 33, the received light data on the frame 34 is transferred to the memory 63 and overwritten in the region in which the data on the frame 1 is stored. When the data on the frame 34 is stored in the memory 63, the temporal gravity center Npeak is calculated for each of the pixels in the lines 34. In this manner, the temporal gravity center Npeak is calculated for a total of 200 lines from the first line to the final line 231.

Next, a description will be given to a structure of the gravity center calculating circuit 73 and to the process of calculating the temporal gravity center Npeak performed by the gravity center calculating circuit 73.

Figure 11:
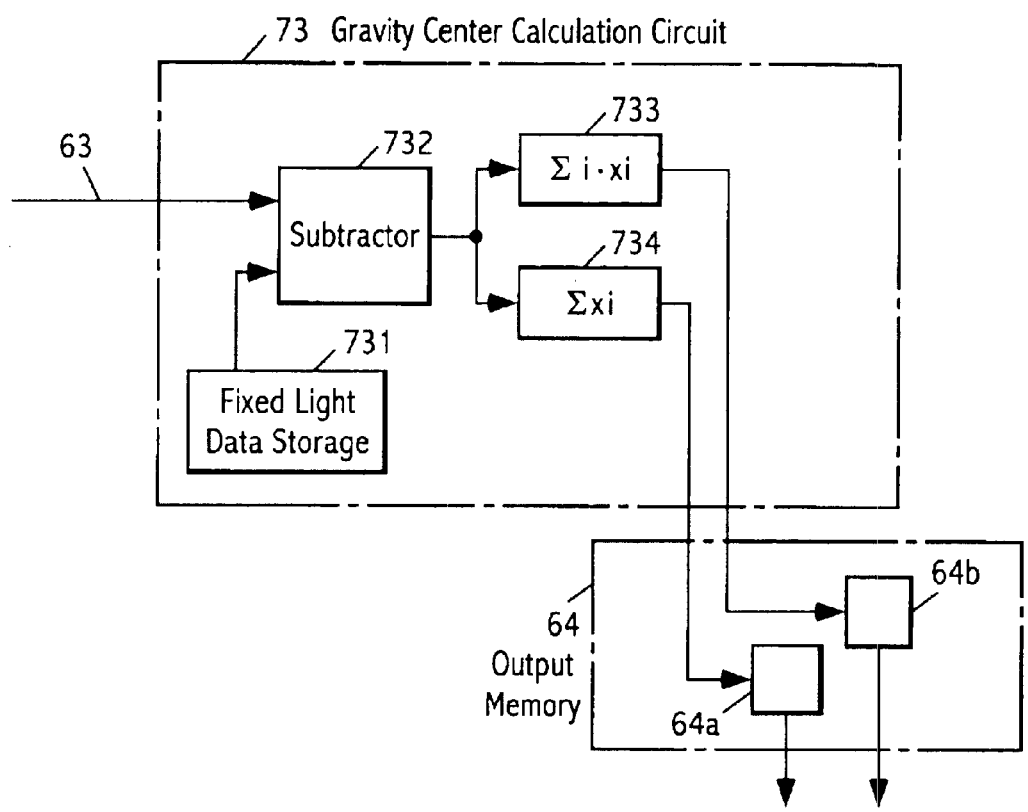
FIG. 11 is a block diagram showing a structure of a gravity center calculating circuit.
Figure 12:
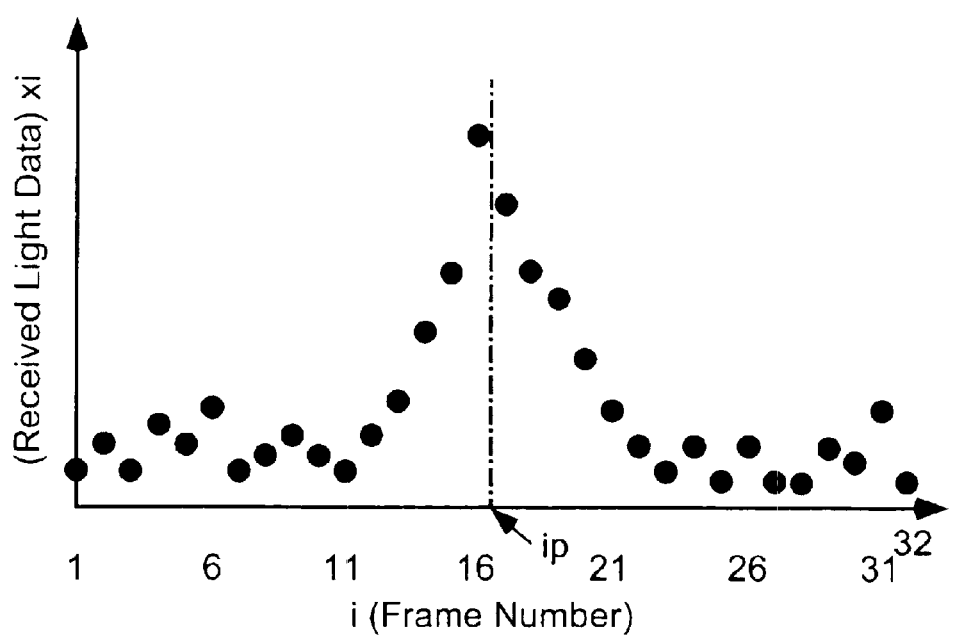
FIG. 12 is a view showing the concept of a temporal gravity center.

FIG. 11 is a view showing the structure of the gravity center calculating circuit 73. FIG. 12 is a view showing the concept of the temporal gravity center Npeak.

As shown in FIG. 12, the temporal gravity center Npeak is the gravity center for the thirty-two items of received light data obtained by the thirty-two sessions of sampling. Sampling numbers 1 to 32 are assigned to the thirty-two items of received light data for each pixel. The i-th received light data is represented by xi where i is an integer of 1 to 32. In this case, i represents the frame number after one pixel enters the effective light receiving area Ae.

The gravity center ip for the 1st to 32nd light received data x1 to x32 is obtained by dividing the total sum Σi·xi of i·xi by the total sum Σxi of xi for the thirty-two items of received light data.

The gravity center calculating circuit 73 calculates the gravity center ip (i.e., temporal gravity center Npeak) for each pixel based on data read from the memory 63. However, it is not that the data read from the memory 63 is used as it is without any alteration but that a value obtained by subtracting fixed light data ks from each item of data (or 0 if the obtained value is negative) is used. In short, subtracting the fixed light data ks therefrom offsets the received light data outputted from the sensor 53.

The fixed light data ks is data calculated based on the received light data on pixels when the slit light beam U is not incident. As the fixed light data ks, a predetermined fixed value may be used or, alternatively, the fixed light data ks may be calculated in real time by using data outputted from the sensor 53. If the fixed value is to be used, "5", "6", or "10", for example, may be used when the sensor 53 produces an 8-bit output (in 256 tones). If the fixed light data ks is to be calculated in real time, the mean value of the thirty-two items of received light data on one target pixel and the thirty-two items of received data on each of two pixels previous and subsequent to the target pixel is calculated and received light data with the smaller mean value is properly used as the fixed light data ks. This is because the slit light beam U is not incident upon both of areas anterior or posterior to the effective light receiving area Ae, which enables real-time calculation of the received light data when the slit light beam U is not incident. It is also possible to use, as the fixed light data ks, the received light data on either of the two pixels previous and subsequent to the target pixel with the larger mean value. Alternatively, it is also possible to use the mean value of the thirty-two items of received light data on two previous pixels or on two subsequent pixels instead. It is also possible to use the received light data on one pixel. Depending on the configuration of the object Q or noise contained in the received light data, it is also possible to use, as the fixed light data ks, a value obtained by adding a specified value (e.g., "5") to any of those values, thereby increasing the amount of offset and more positively cutting an unwanted noise component. Although the size of one frame becomes 36 lines, 34 lines, or 33 line in that case, the gravity center ip can be calculated properly by using thirty-two items of data on 32 lines.

In the exemplary embodiment of FIG. 11, the gravity center calculating circuit 73 consists of: a fixed light data storage element 731; a subtracter 732; a first adder 733; and a second adder 734. These components are implemented by using software but it is also possible to compose all or a part of the components by a hardware circuit.

The fixed light data storage element 731 stores the fixed light data ks. The subtracter 732 subtracts the fixed light data ks from the inputted received light data. Here, the data outputted from the subtracter 732 is defined again as the received light data xi. The first adder 733 adds up i·xi for i=1 to 32 and outputs the sum. The second adder 734 adds up Σi·xi for i=1 to 32 and outputs the sum. The output values from the first and second adders 733 and 734 are stored in respective output memories 64a, 64b. The data stored in the output memories 64a, 64b is outputted from the digital output terminal 33 to the control unit 12 via a SCSI controller 66. In the control unit 12, the process of calculating a 3-D position is performed based on the data. For example, the gravity center ip is calculated by dividing the output value from the first adder 733 by the output value from the second adder 734. Such a divider may also be provided in the gravity center calculating circuit 73.

Although the light receiving position (yp) on the image pickup surface shifts with the deflection of the slit light beam U in accordance with the method of calculating a temporal gravity center, the gravity center (temporal gravity center) Npeak during a specified period of time is calculated for the output(x) of each pixel on the image pickup surface. Since the temporal gravity center Npeak obtained for a certain pixel is the timing (i) for the maximal output (x) of the pixel, the projection angle Θa can be obtained based on the temporal gravity center Npeak. The position of the pixel that has already been known is a precise light receiving position (xp, yp). The acceptance angle Θp can accurately be calculated from the light receiving position (yp). The coordinates Z of the point P on the object can accurately be calculated from the acceptance angle Θp and the projection angle Θa. Hence, the 3-D position (X,Y,Z) of the point P on the object can accurately be calculated based on the temporal gravity center Npeak and the light receiving position (xp,yp).

Figure 13:
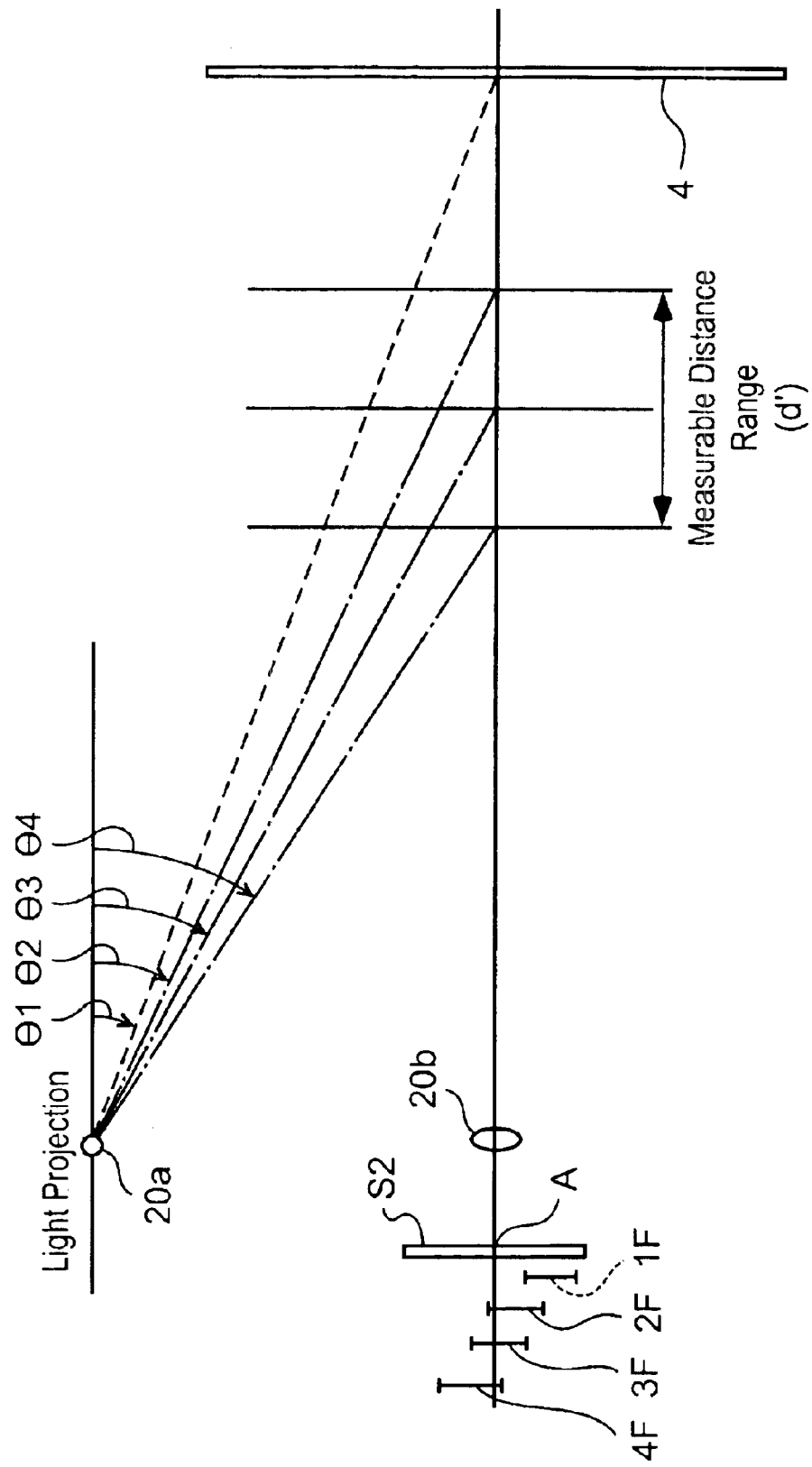
FIG. 13 is a view for illustrating the relationship between the frame and a measurable distance range on the image pickup surface.

FIG. 13 is a diagram illustrating the relationship between frames F on the image pickup surface S2 and the measurable distance range.

In FIG. 13, a frame 1F on the image pickup surface S2 is read with the timing with which the projection angle Θa is an angle Θ1. Likewise, frames 2F, 3F, and 4F on the image pickup surface S2 are read with the timing with which the projection angles Θa are angles Θ2, Θ3, and Θ4, respectively.

The viewing direction of the pixel at the point A on the image pickup surface S2 can be measured during a period in which the projection angle Θa ranges from the angle Θ2 to the angle Θ4. Accordingly, the distance range over the optical axis passing through the point A irradiated with the reference beam during the period is the measurable distance range. In the case where a target object to be measured is at a larger distance, it is unmeasurable since the reference beam cannot be detected.

Thus, according to the present embodiment, the operator HM is positioned within the measurable distance range and the background screen 4 is disposed outside the measurable distance range, whereby the 3-D data is obtained only from the operator HM.

A description will be given next to the respective positions of the light projecting window 20a and the light receiving windows 20b.

Since the present apparatus involves the processing of the material into the front face, measurement is most preferably performed from the front side of the object. Consequently, the light receiving window 20b is preferably positioned adjacent the display surface 14a. This is because the operator HM in most cases faces the display surface 14a since he normally performs operation while viewing the display surface 14a.

It is necessary to position the light projecting window 20a at a certain distance from the light receiving window 20b to provide a base line of sufficient length. The light projecting window 20a is also most preferably positioned in front of the operator HM. If the reference beam is radiated from above the operator HM, the reference beam does not reach a portion under the nose, which is shaded and cannot be measured.

In view of the foregoing, a description will be given to an example of arrangement.

Figure 14A:
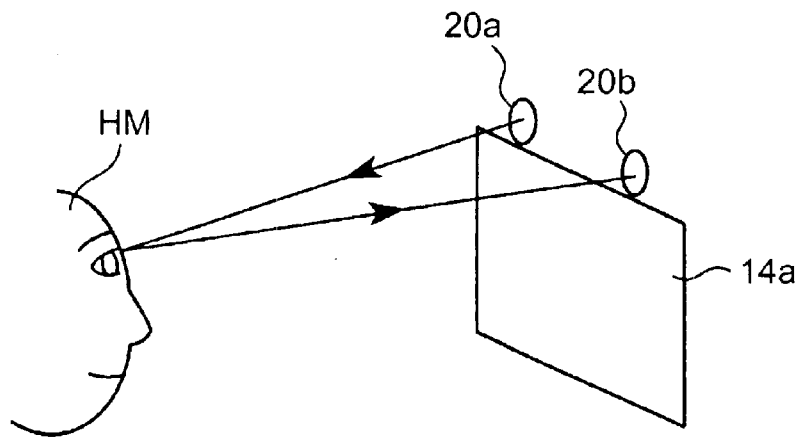
FIGS. 14a, 14b and 14c are diagrams showing an example in which a light projecting window and a light receiving window are arranged on the periphery of a display surface.
Figure 14B:
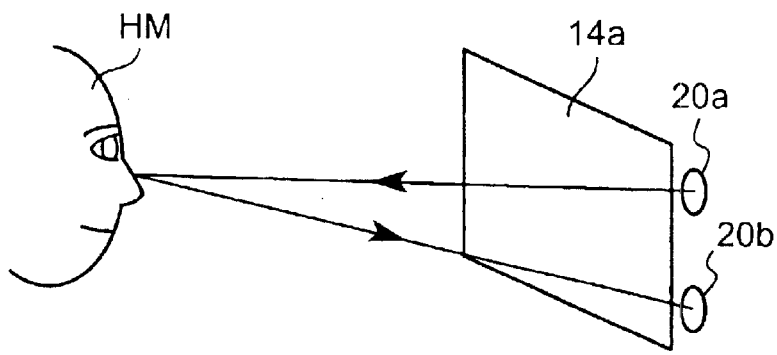
Figure 14C:
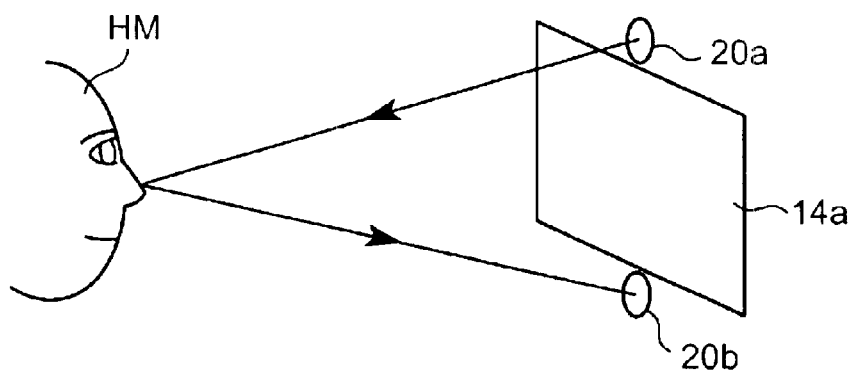
Figure 15:
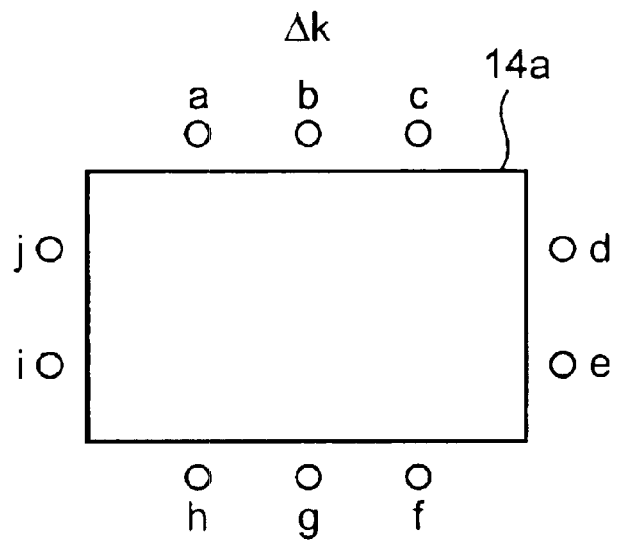
FIG. 15 is a diagram illustrating positions at which the light projecting window and the light receiving window can be placed.
Figure 16:
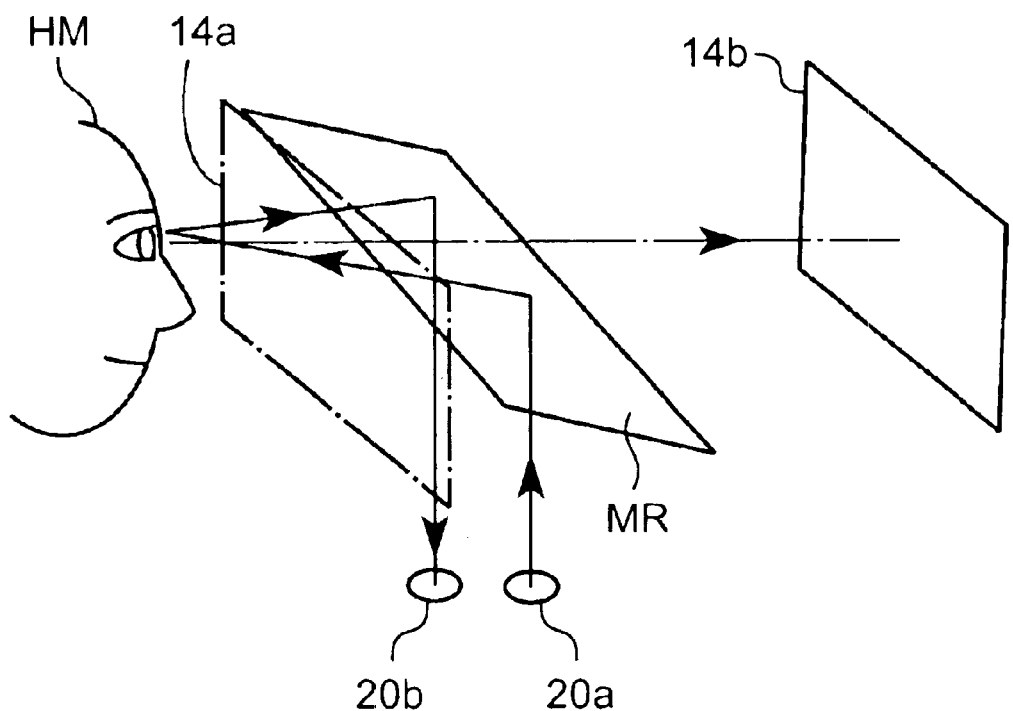
FIG. 16 is a diagram showing an example in which the light projecting window and the light receiving window are positioned on the same line of sight as the display surface.

FIGS. 14(A), 14(B) and 14(C) are diagrams showing an example in which the light projecting window 20a and the light receiving window 20b are arranged on the periphery of the display surface 14a. FIG. 15 is a view for illustrating positions at which the light projecting window 20a and the light receiving window 20b can be placed. FIG. 16 is a view showing an example in which the light projecting window 20a and the light receiving window 20b are placed on the same line of sight as the display surface 14a.

FIG. 14(A) shows the arrangement according to the present embodiment. That is, in the present embodiment, the light projecting window 20a and the light receiving window 20b are arranged along the upper edge of the display surface 14a. With such an arrangement, parallax experienced by the operator HM between the light projecting window 20a, the light receiving window 20b, and the display surface 14a is reduced, which allows the face HMf of the operator HM facing the display surface 14a to be shot at a near front angle by means of the 3-D measuring unit 111.

It is also possible to arrange the light projecting window 20a and the light receiving window 20b along the right edge of the display surface 14a, as shown in FIG. 14(B). Alternatively, the light projecting window 20a and the light receiving window 20b may also be arranged to have the display surface 14a vertically interposed therebetween, as shown in FIG. 14(C). In this case, however, the length of the base line between the light projecting window 20a and the light receiving window 20b should be increased. In these arrangements also, the parallax between the light projecting window 20a, the light receiving window 20b, and the display surface 14a is reduced.

Similar effects can also be achieved if the light projecting window 20a and the light receiving window 20b are placed at positions in any of the combinations a and c, d and e, f and h, i and j, and b and g. The respective positions of the light projecting window 20a and the light receiving window 20b may also be interchanged. Although the respective positions of the light projecting window 20a and the light receiving window 20b are symmetrical to each other relative to the center line of the display surface 14a in the example shown in FIG. 15, it is also possible to offset the positions thereof to either side.

It is to be noted that, if the light projecting window 20a and the light receiving window 20b are placed at the positions k and b, respectively, the operator HM experiences increased parallax to have his eyes downcast, which renders him less photogenic in the resulting photograph. In addition, the nose of the operator H casts a shadow, resulting in missing data.

In the example shown in FIG. 16, the display device of the monitor unit 14 is positioned at the back of the main body case 10 and a half mirror MR is interposed between the display surface 14b of the display device and the display surface 14a anterior to the operator HM. The display surface 14a is composed of a transparent glass plate. The half mirror MR is tilted at an angle of 45 degrees with respect to the display surfaces 14a and 14b. The light projecting window 20a and the light receiving window 20b are positioned to have the line of sight of the operator HM sandwiched therebetween by using the reflection of the half mirror MR. The operator HM can see the image displayed on the display surface 14b of the display device through the display surface 14a.

The example shown in FIG. 16 can minimize the parallax between the line of sight when the operator HM views the display surface 14a, the light projecting window 20a, and the light receiving window 20b. As a result, the half mirror MR halves the reference beam used in the 3-D measuring unit 111. The arrangement is extremely effective when the quantity of light is sufficiently large.

It is also possible to interchange the position of the display device and the positions of the light projecting window 20a and light receiving window 20b. In that case, the image displayed on the display surface 14b is reflected by the half mirror MR and viewed by the operator HM, so that it is necessary to preliminarily reverse the image on the monitor unit 14 left to right. It is also possible to arrange the light projecting window 20a and the light projecting window 20b on the periphery of the display surface 14b of the display device positioned at the back. The arrangement in that case is in conformity with the arrangement shown in FIG. 15.

Next, a description will be given to a structure of the processing unit 17 and a method of processing performed by the processing unit 17.

As stated previously, the processing unit 17 is provided with: the processing-system controller 171; the processing mechanism 172; and the material supply mechanism 173. The processing-system controller 171 controls the processing mechanism 172 based on the NC data transmitted from the control unit 12. The part corresponding to the face HMf of the operator HM is formed through cutting work performed by processing mechanism 172. A material used therefor is preliminarily selected by the operator HM from a plurality of, e.g., five head materials and supplied by the material supply mechanism 173. After the processing of the head material is completed, the processed head material is joined with a body material similarly selected in advance by the operator HM, resulting in a complete three-dimensional model.

Figure 17A:
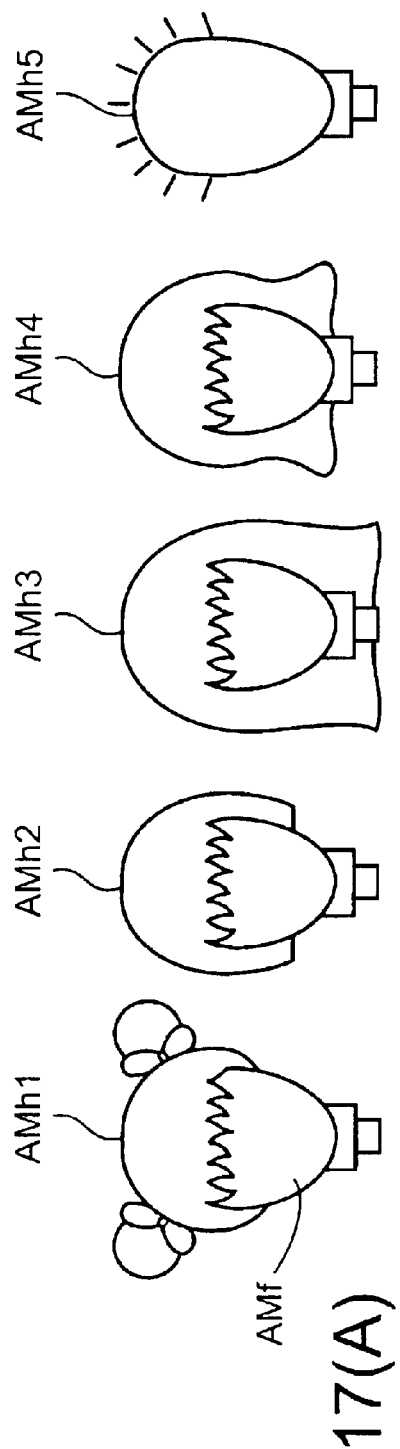
FIGS. 17a and 17b are examples of head material and body material, respectively.
Figure 17B:
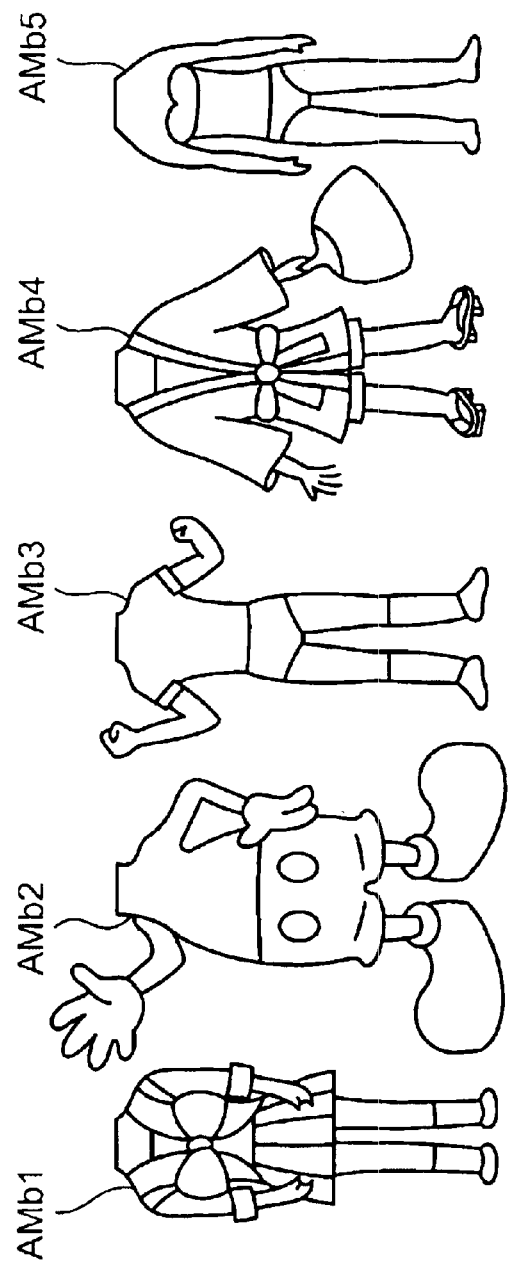

FIGS. 17(A) and 17(B) are illustrations showing the head materials AMh1 to AMh5 and the body materials AMb1 to AMb5. FIG. 18 is a view showing the processed head material AMh to be joined to the body material AMb. FIG. 19 shows a difference between the pre-processing configuration of the head material AMh and the post-processing configuration thereof.

As shown in FIGS. 17(A) and 17(B), the five head materials AMh1 to AMh5 and the five body materials AMb1 to AMb5 are prepared in the human body modeling system 1. It is to be noted that there are cases where the present specification refers to all or a part of the head materials AMh1 to AMh5 as "head material AMh". The same shall apply to the body materials AMb1 to AMb5.

In most cases, a variety of hair styles are prepared for the head material AMh, while a variety of clothes are prepared for the body material AMb. In addition to that, various materials are used to imitate a celebrity, a cartoon character, an imaginary character, an animal, and a foreground. In FIG. 17(B), a school uniform, Mickey Mouse, an athlete outfit, a traditional Japanese festival coat, and a swim suit are used as exemplary body materials AMb.

The operator HM can choose one from the five head materials and one from the five body materials. In other words, the operator HM can choose a preferred one from a total of 25 combinations and enjoy a wide variety.

As is obvious from FIGS. 19(A) and 19(B), the head material AMh has a projecting portion fp on the face AMf, which serves as a processing margin. The projecting portion fp is processed by cutting work using a cutting tool, forming the face HMf continued from other parts such as hair and ears. As the head material AMh, therefore, a material having such properties as to allow easy cutting and high-precision processing is used. For example, synthetic resin such as ABS or wood is used. Other materials such as paper, clay, metal, and synthetic rubber may also be used depending on the processing method.

By contrast, a soft and readily formable material, e.g., synthetic rubber or soft synthetic resin is used as the body material AMb. It is also possible to provide an additional function by burying a wire in the head material AMb, thereby allowing the configurations of the limbs to be changed freely. By thus using different materials intended for different purposes as the head material AMh and the body material AMb, there can be provided a three-dimensional model which is highly satisfactory to the operator HM.

As shown in FIG. 18, the portion of the head material AMh corresponding to a neck hn is provided with a downwardly extending projection hp and the upper end of the body material AMb is provided with a flat portion bne and a hole bh having an inner diameter smaller than the outer diameter of the aforesaid projection hp. In joining the head material AMh with the body material AMb, the projection hp is press-fitted into the hole bh to bring the bottom surface hne of the neck hn into contact with the flat portion bne of the body material AMb. No matter which head material AMh or body material AMb is selected, excellent joining is performed such that the neck hn is continued naturally from the head material AMb.

The head material AMh is integrated with the body material AMb by press fitting to produce the three-dimensional model. It is also possible to preliminarily dye a prototype portion ha of the head material AMh and the body material AMb in a suitable color and a suitable pattern. If the projecting portion fp is dyed in the same color, i.e., flesh color or white, as the face HMf, it is in harmony with the other colored portions without a post-processing coloring process.

The eyebrow portions of the face HMf, which are black and not protruding conspicuously, are shot in most cases flat and, oftentimes, data on the eyebrows are not contained in the 3-D data. To prevent the production of a three-dimensional model MS that has no eyebrow, it is appropriate to detect the eyebrow portions based on the 2-D data and dye the detected portions in black.

The three-dimensional model MS can be disassembled by manually pulling the head material AMh out of the body material AMb. This indicates that the projection hp has been fitted into the hole bh with such tightness as to permit the operator HM to easily twist off the head material AMh. As a result, it becomes possible to switch the head materials AMh and body materials AMb of a plurality of three-dimensional models MS like dress-up dolls.

In the case where there is no need to disconnect the head material AMh fitted in the body material AMb therefrom or where the projection hp readily comes out of the hole bh because of loose fitting, an adhesive may be used. Although the present embodiment has joined the head material AMh with the body material AMb in the processing unit 17 to discharge the integral three-dimensional model MS, it is also possible to separately discharge the head material AMh and the body material AMb as a product without joining them such that the operator HM fits the head material AMh into the body material AMb.

As described above, the head material AMh is composed of the prototype portion ha preliminarily formed into a specified configuration and the projecting portion fp provided on the face portion. The prototype portion ha corresponds to an area from which the 3-D data on the operator HM cannot be obtained through shooting performed by the 3-D measuring unit 111. The prototype portion ha contains a part of hair, a part of ears, a part of cheeks, and a part of a forehead. The projecting portion fp is processed based on the 3-D data obtained by the 3-D measuring unit 111 to form the face AMf.

By thus forming only the face AMf of the head HMh through processing and using the prototype portion ha to form the other portion of the head HMh, the acquisition of the 3-D data by the 3-D measuring element 11 becomes easy and the human body modeling apparatus 3 is prevented from being increased in size.

More specifically, accurate 3-D data cannot be obtained on a hair string because of its low reflectance. Since a hair string is fine, a high-accuracy 3-D measuring element is needed to duplicate the hair string with fidelity. This increases the amount of 3-D data as well as time required for shooting and data processing. To obtain the 3-D data on every part of the head HMh, on the other hand, a plurality of 3-D measuring elements are needed or a device for rotating the operator HM is needed, resulting in a complicated large-scale apparatus and longer shooting time. By using the prototype portion ha to compose a portion from which 3-D data cannot be obtained easily, problems resulting from insufficient data on, e.g., a hair string can be solved. Moreover, since 3-D data can be obtained only by uni-directional shooting from the front side, the apparatus can be prevented from being complicated and increased in size.

It is also possible to use the prototype to compose a portion from which 3-D data can be obtained without performing processing based on the 3-D data obtained.

In processing the projecting portion fp to form the face AMf, the processing is performed such that the face AMf is smoothly continued from the prototype portion ha after processing. For this purpose, a correction process for smoothing is performed with respect to the 3-D data on the face AMf. A joint between the face AMf and cheeks or hair becomes less conspicuous through the smoothing correction, which provides a normal and natural look.

To enhance processing accuracy, chucking, i.e., alignment during the processing of the head material AMh is performed with high accuracy.

A description will be given next to the smoothing correction and chucking.

Figure 20A:
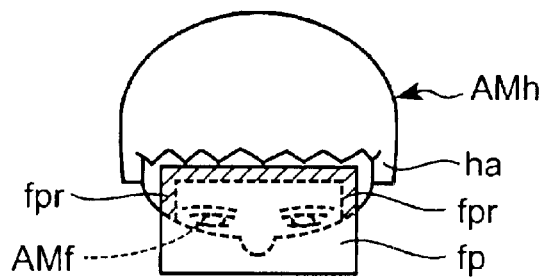
FIGS. 20a, 20b and 20c are views showing a face region of the head material.
Figure 20B:
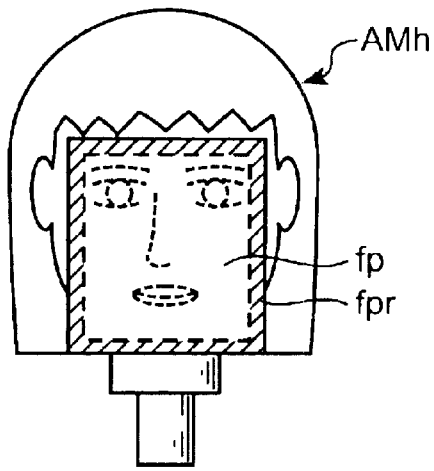
Figure 20C:
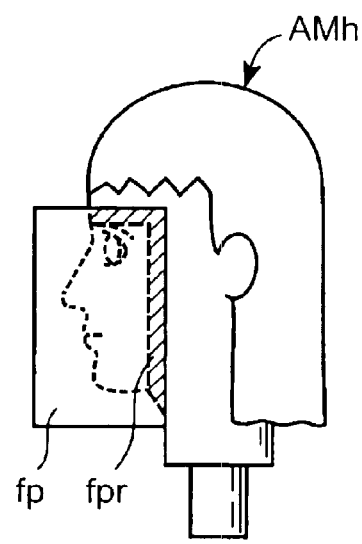
Figure 21A:
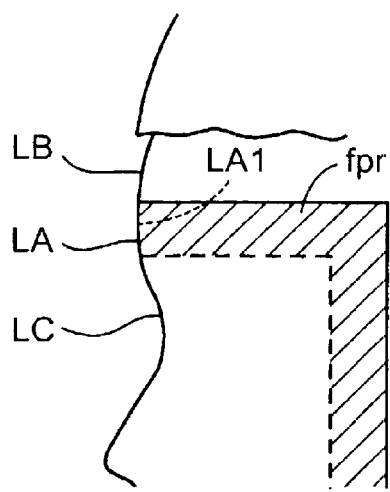
FIGS. 21a and 21b are diagrams for illustrating smoothing processing performed by the process of interpolation.
Figure 21B:
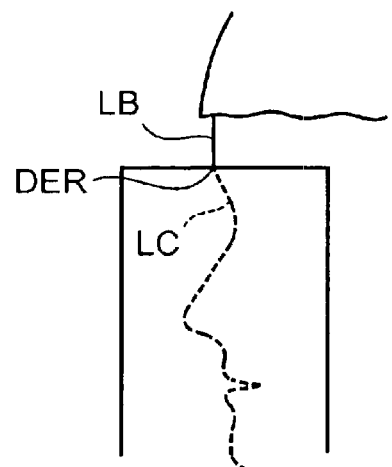
Figure 22:
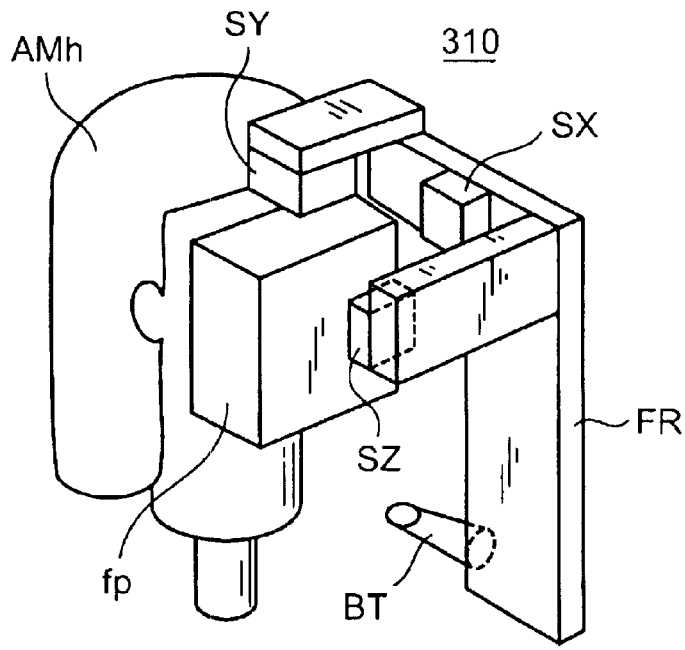
FIG. 22 is a view showing an exemplary structure of a position measuring device for measuring the position of the head material.
Figure 23:
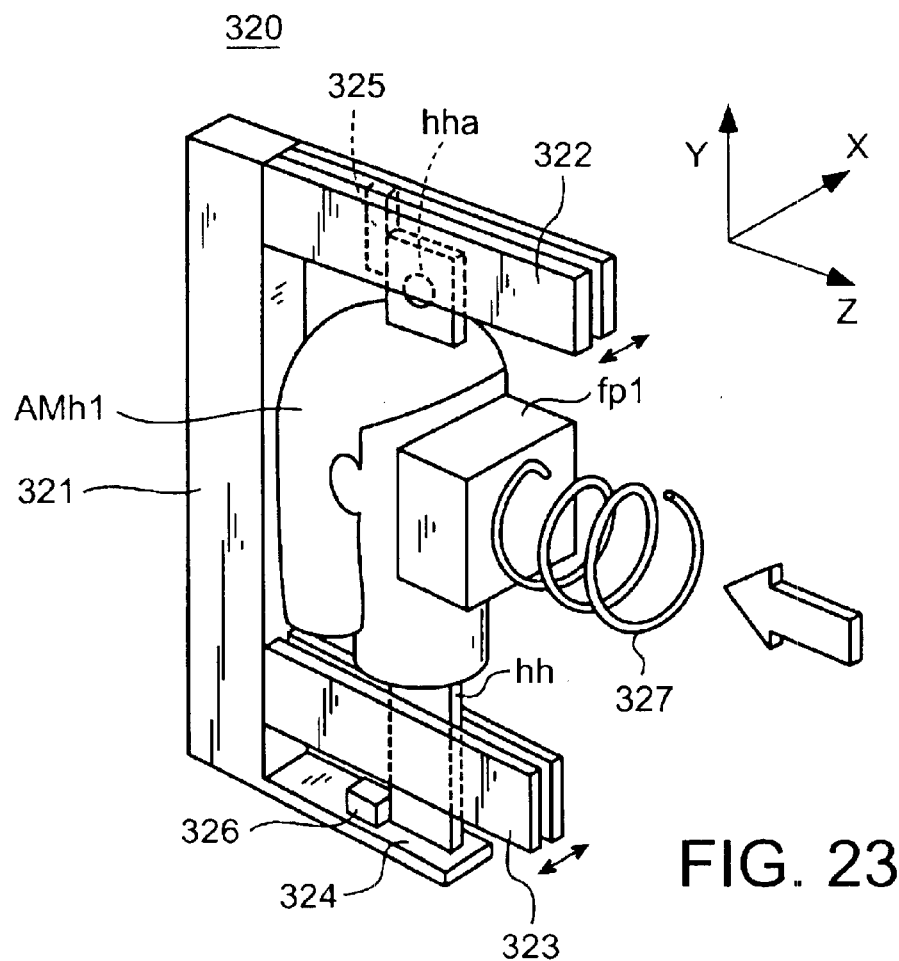
FIG. 23 is a view showing a head material and an exemplary structure of a chucking device according to another embodiment.
Figure 24:
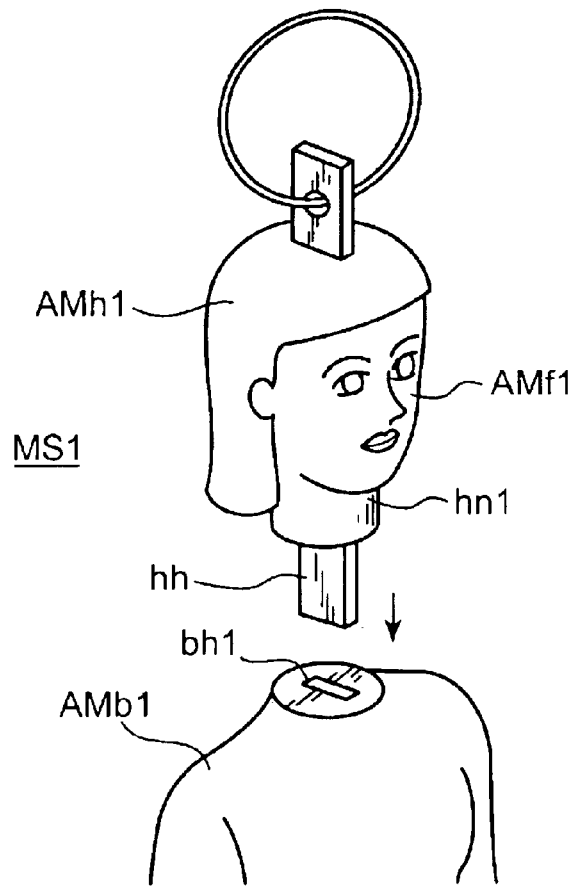
FIG. 24 is a view showing a three-dimensional model composed of the head material of FIG. 23 and a body material.

FIGS. 20(A), 20(B) and 20(C) are views showing the region of the head material AMh corresponding to the face AMf. FIGS. 21(A) and 21(B) are views illustrating the smoothing processing implemented by the process of interpolation. FIG. 22 is a view showing an exemplary structure of a position measuring element 310 for accurately measuring the position of the head material AMh during chucking. FIG. 23 is a view showing a head material AMh1 and an exemplary structure of a chucking element 320 for chucking the head material AMh1 according to another embodiment. FIG. 24 is a view showing a three-dimensional model MS1 obtained by joining the head material AMh1 to the body material AMb1 shown in FIG. 23. FIG. 21(B) shows an undesirable example with an artificial and unnatural look.

In FIGS. 20(A), 20(B) and 20(C), the projecting portion fp is processed by the processing mechanism 172. To provide smoothness between the projecting portion fp and the peripheral portion, smoothing interpolation is performed with respect to a buffer region fpr provided on the periphery of the projecting portion fp.

More specifically, the configuration of the face HMf differs from one operator HM to another. For example, the configuration of the forehead is different from one operator HM to another and, if the projecting portion fp is processed based on the 3-D data obtained as it is by the 3-D measuring unit 111, a line may appear in a boundary portion DER with the prototype portion ha as shown in FIG. 21(B), resulting in an artificial and unnatural look.

To eliminate the artificial and unnatural look, corrected data obtained by performing a correction with respect to the 3-D data is used for the buffer region fpr to provide smoothness between the buffer region fpr and the regions on both sides thereof, as shown in FIG. 21(A).

The correction process performed with respect to the 3-D data is initiated by connecting, with the line LA1, the end portion of the forehead curve LB and the end portion of the facial curve LC which are located on both sides of the buffer region fpr, as shown in FIG. 21(A). Next, the line LA1 is deformed to the curve LA which naturally and smoothly connects the curve LB, the curve LC, and the line LA1. If necessary, the curve LC is also corrected at the same time.

As another method of smoothing correction, there is one in which no buffer region fpr is provided. In accordance with the method, the curves LB and LC are directly connected to each other, as shown in FIG. 21(B), and then a correction is performed with respect to the curve LC to provide smooth connection.

The 3-D data on the prototype portion ha of each of the head materials AMh is preliminarily stored in the control unit 12 such that the 3-D data on the prototype portion ha of the head material AMh chosen by the operator HM is used. Data on the aforesaid curve LB is obtained based on the 3-D data.

In this manner, a proper curve is calculated by image processing such that actual processing is performed based on the corrected 3-D data. The production of the corrected data, i.e., the correction of the 3-D data is performed in the control unit 12 in converting the 3-D facial data to the NC data for the processing unit 17.

To provide a smooth look through processing based on such corrected data, it is necessary to chuck the head material AMh with high accuracy. A description will be given below to a method of enhancing the processing accuracy.

As a method of maximizing accuracy during the processing of the head material AMh, there is one in which the position of the head material AMh is detected in all or any of the three directions X, Y, and Z by using a contacting or non-contacting positional sensor after the head material AMh is chucked and the position of the head material AMh is fed back to the initial position of the cutting tool in the processing mechanism 172 and to the inclination of a reference surface for processing. The method eliminates a factor responsible for lower accuracy such as a varying relationship between the reference surface for processing in the processing mechanism 172 and the reference surface (cutting surface) of the head material AMh, which is different from one product to another, and an error in chucking the head material AMh.

In FIG. 22, the position of each surface of the projecting portion fp of the chucked head material AMh is measured by using the positional measuring element 310 consisting of sensors SX, SY, and SZ for respective directions that have been attached to a cutting table FM. When the position of the projecting portion fp is measured, a deviation from the reference position is calculated and fed back to the initial position of the cutting tool BT. The cutting tool BT has been fixed to the cutting table FM and moves integrally with the sensors SX, SY, and SZ.

Even if an error occurs in the alignment of the head material AMh, therefore, the initial position of the cutting tool BT can be moved to a predetermined point on the surface of the projecting portion fp to be cut. A sufficient space for keeping the sensors SX, SY, and SZ away from the head material AMh and from the peripheral region is provided, thereby preventing the'sensors SX, SY, and SZ from interfering with the head material AMh and with the peripheral region during cutting.

The use of the sensors SX, SY, and SZ achieves improved processing accuracy but presents a problem in terms of suppressing cost increase and reducing space. To improve the processing accuracy without using the sensors SX, SY, and SZ, the head material AMh should be chucked with high accuracy. For this purpose, it is necessary to configure the head material AMh such that it permits easy and high-accuracy chucking.

In FIG. 23, a metal member hh for alignment vertically extends through the head material AMh1 from the center of the head to the neck to achieve integral joining. The metal member hh is aligned with high accuracy with respect to the reference position for processing the head material Mh1. The upper end portion hha of the metal member hh is formed with a hole for the attachment of a ring when the product is used as a key holder.

The chucking device 320 is composed of a chucking unit 321 for holding the device, upper and lower chucking elements 322 and 323 which open and close in the X direction, a Y-direction stopper 324, Z-direction stoppers 325, 326, and a spring 327.

In the chucking device 320, alignment is performed in each of X, Y, and Z directions to chuck the head material AMh1 with high accuracy. Specifically, alignment is performed in the X direction with the upper and lower chucking elements 322 and 323 having the metal member hh sandwiched therebetween, while alignment is performed in the Y direction by pressing the lower end of the metal member hh against the Y-direction stopper 324. On the other hand, alignment is performed in the Z direction by pressing the metal member hh against the Z-direction stoppers 325, 326 by means of the spring 327. Thus, the whole chucking device 320 having chucked the head material AMh1 with high accuracy is aligned with high precision with respect to the cutting unit having the cutting tool, so that cutting work is performed. Since the metal member hh is chucked, there is offered the advantage of preventing the other portion of the head material AMh from being damaged.

As shown in FIG. 24, the head material AMh1 after cutting work is joined integrally with the body material AMb1. The upper end of the body material AMb1 is provided with a flat portion bne1 and a slit hole bh1 is formed in the near center thereof. The lower end portion of the metal member hh is inserted into the hole bh1 and the lower end face of the neck hn1 is brought into contact with the flat portion bne1, whereby the three-dimensional model MS1 is assembled.

By thus performing the smoothing correction with respect to the 3-D data obtained by the 3-D measuring unit 111 and performing high-accuracy processing, there can be obtained a workpiece having an unobtrusive joint between the face and the peripheral portion, resulting in a three-dimensional model MS reproducing a look specific to the face HMf of an individual operator HM.

Figure 25:
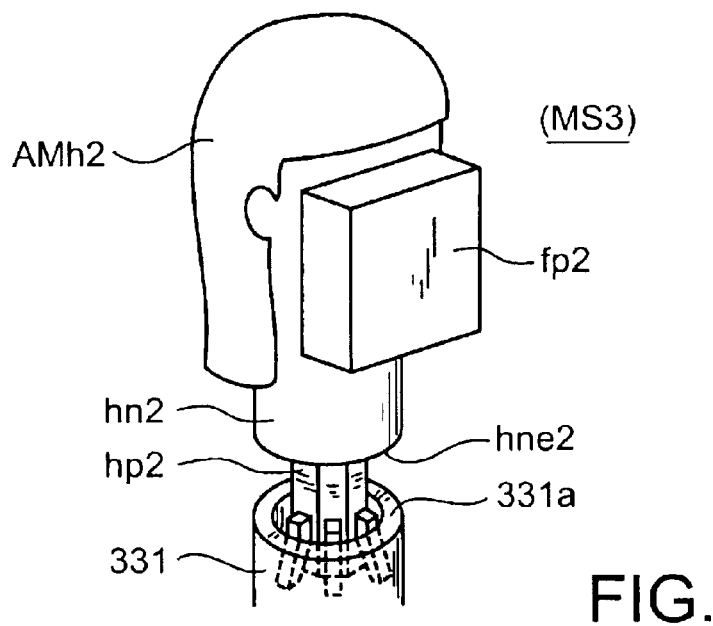
FIG. 25 is a view showing a head material to be chucked according to still another embodiment.
Figure 26:
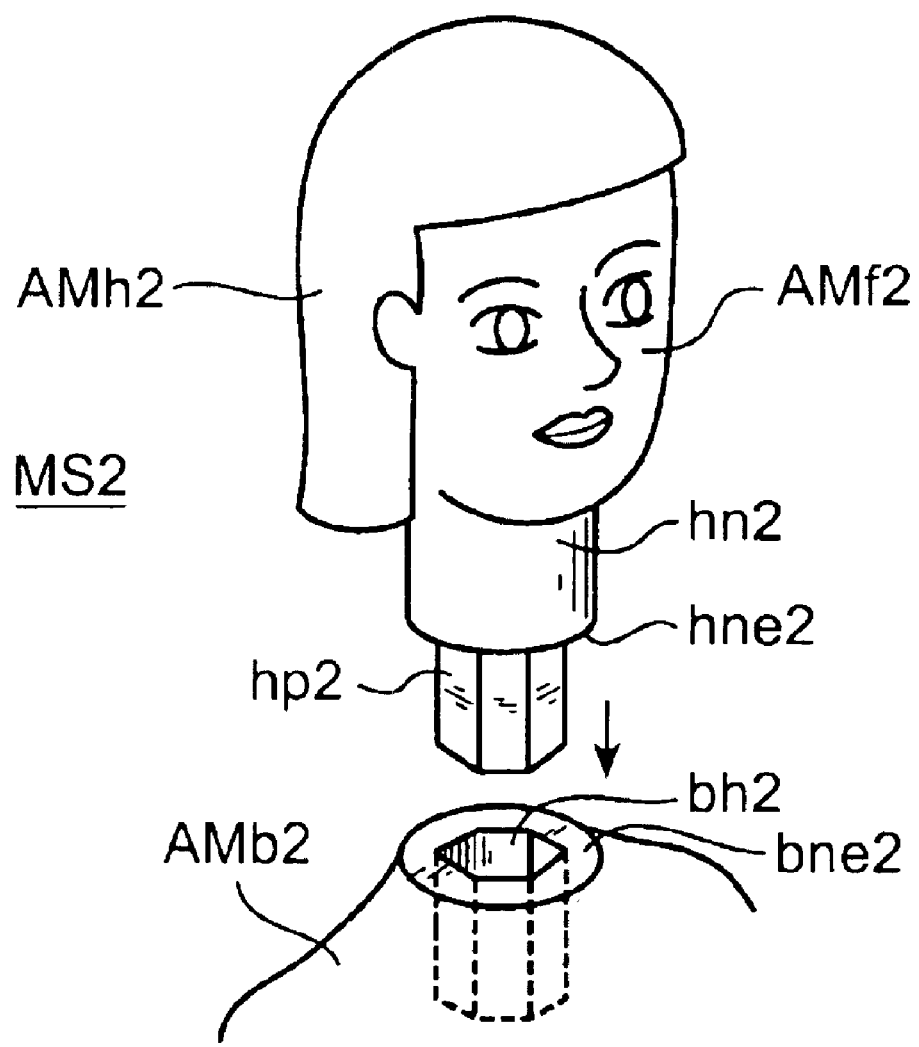
FIG. 26 is a view showing a three-dimensional model composed of the head material of FIG. 25 and a body material.

FIG. 25 is a view showing the head material AMh2 being chucked according to another embodiment. FIG. 26 is a view showing a three-dimensional model MS2 obtained by joining the head material AMh2 of FIG. 25 with a body material AMb2.

In FIG. 25, the portion of the head material AMh2 corresponding to the neck hn2 is provided with a downwardly extending projection hp2 configured as a hexagonal prism or a square prism. The projection hp2 allows chucking using a collet chuck 331. By bringing the lower end face 2 of the neck hn2 into contact with the end face 331a of the collet chuck 331, alignment is performed in the Y direction, thereby maintaining accuracy.

In FIG. 26, the upper end of the body material AMb2 is provided with a flat portion bne2 and a hexagonal hole bh2 into which the foregoing projection hp2 is to be fitted. By inserting the projection hp2 into the hole bh2, they are joined to assemble the three-dimensional model MS2. With the lower end face hne2 of the neck hn2 coming into contact with the flat portion bne2, vertical alignment is performed. Since the projection hp2 and the hole bh2 have hexagonal configurations, the orientation of the face AMf2 is determined by insertion.

Although the foregoing embodiment has assembled the three-dimensional model MS by joining the head material AMh with the body material AMb, it is also possible to form a three-dimensional model MS3 only from the head material AMh2 shown in FIG. 25.

In the case of performing cutting work, a milling cutter is used, for example, as the processing mechanism 172. As described above, the processing mechanism 172 is provided with the chucking device and table for fixing the head material AMh as a workpiece. As the cutting tool, an end mill, a throw-away milling cutter, or the like is used. In the case of not performing cutting work, there can be used such a technique as laminated molding (including a stereo laser scheme), laser processing, electro-discharge machining, molding (pressure molding), or the like.

As an example of the material supply mechanism 173, there is used a device comprising a storage cabinet for accommodating a total of 10 materials, which pushes out the selected material onto a transport path by means of a pushout rod such that the selected material is transported to the chucking device or table by means of a transport rod with a chuck. The plurality of materials that have been prepared are adequately pushed out in succession by using, e.g., an elevator. The materials may also be held by a multi-joint robot or manipulator and carried thereby to the chucking device. It is also possible to fix the cutting table and control the robot based on the 3-D data such that the material carried to the destination is processed while being held by the robot.

The processed head material AMh is joined with the body material AMb by means of the robot or another automated device. The three-dimensional model MS assembled by the joining is discharged from the discharge portion 18. As described above, the head material AMh and the body material may also be discharged separately.

Next, the respective operations of the measuring unit 11 and the control unit 12 as well as the measurement procedure will be described with reference to the following flow charts.

Figure 27:
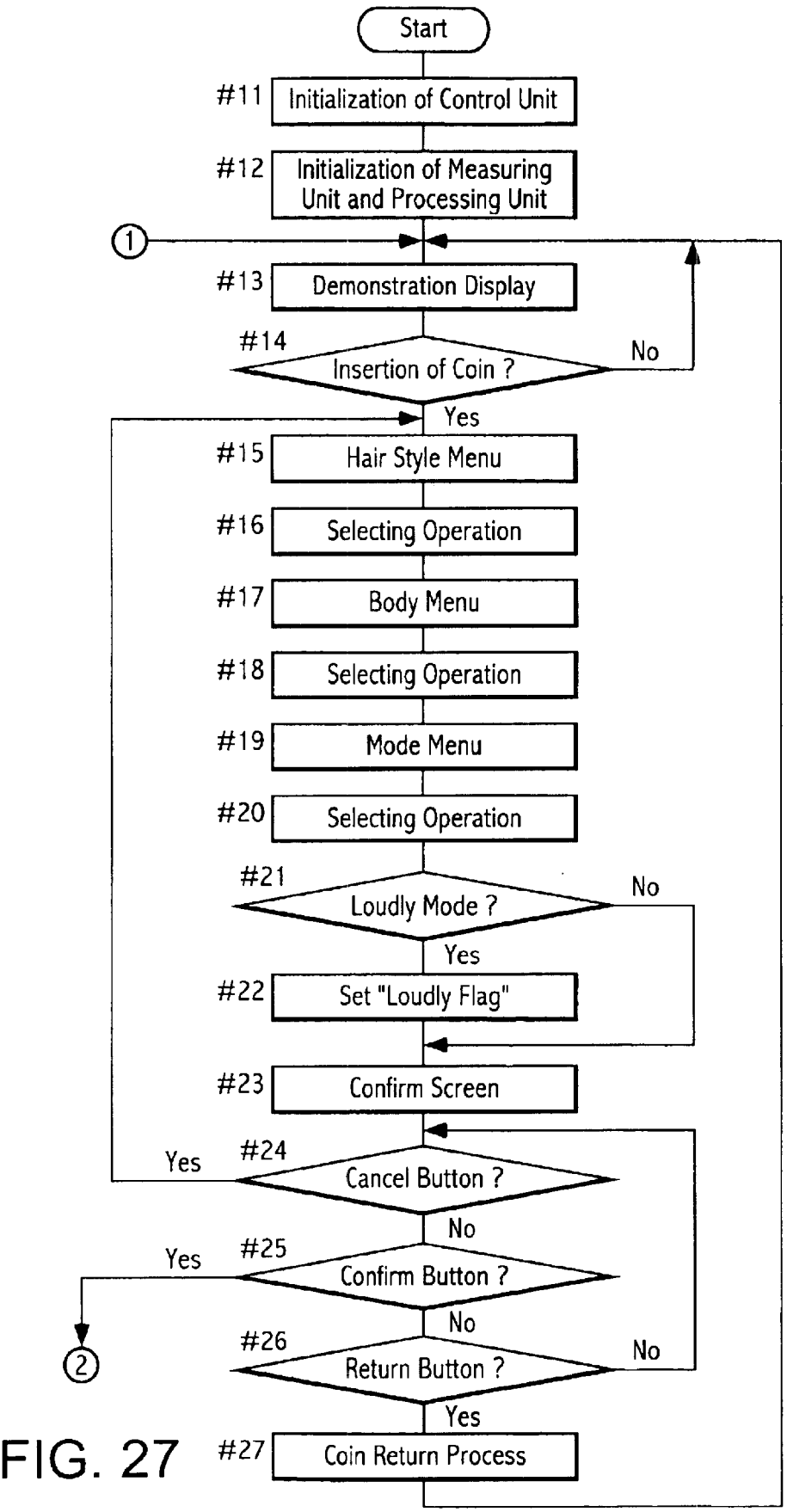
FIG. 27 is a flow chart illustrating a processing operation in a control unit.
Figure 28:
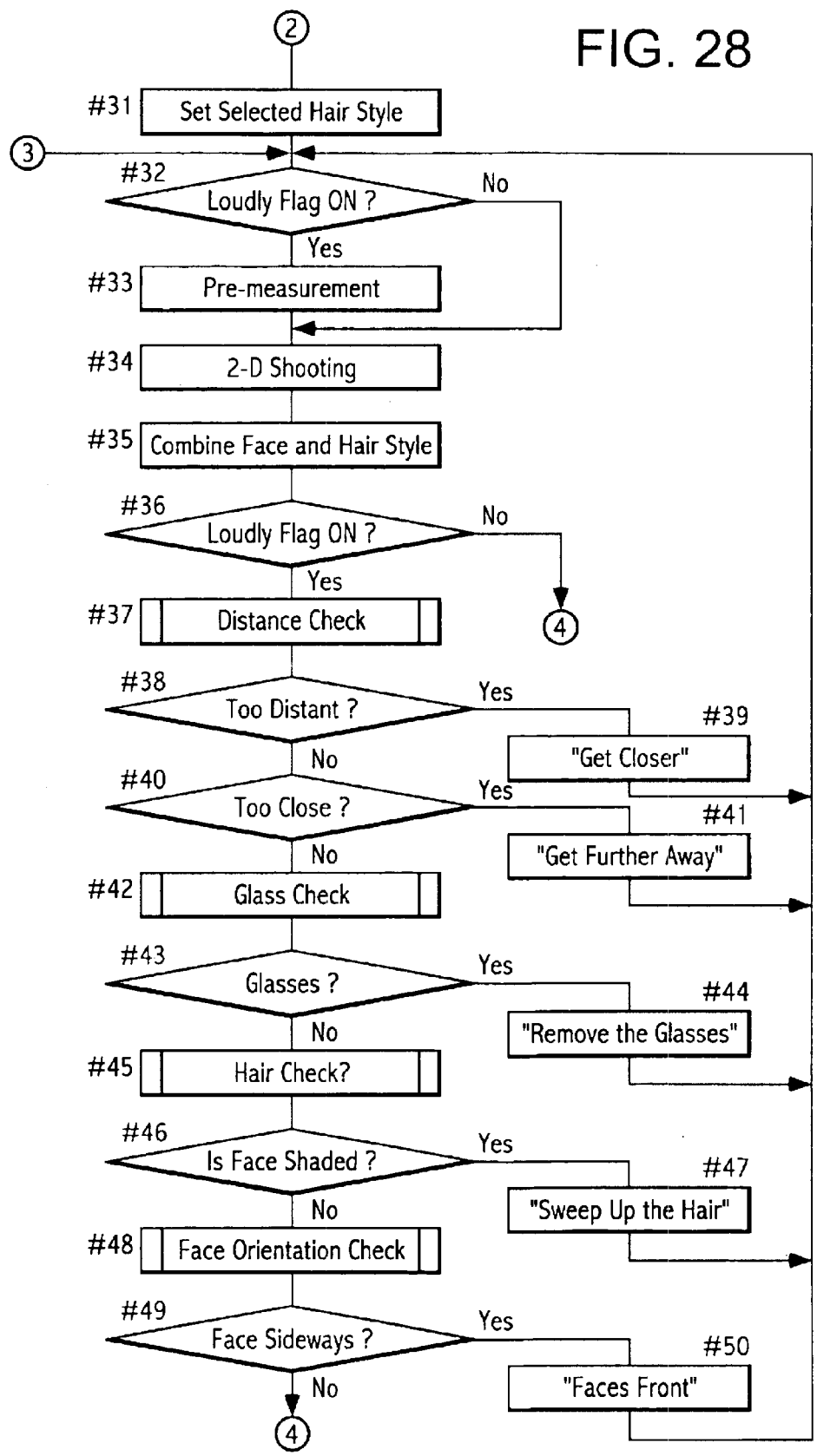
FIG. 28 is a flow chart illustrating the processing operation in the control unit.
Figure 29:
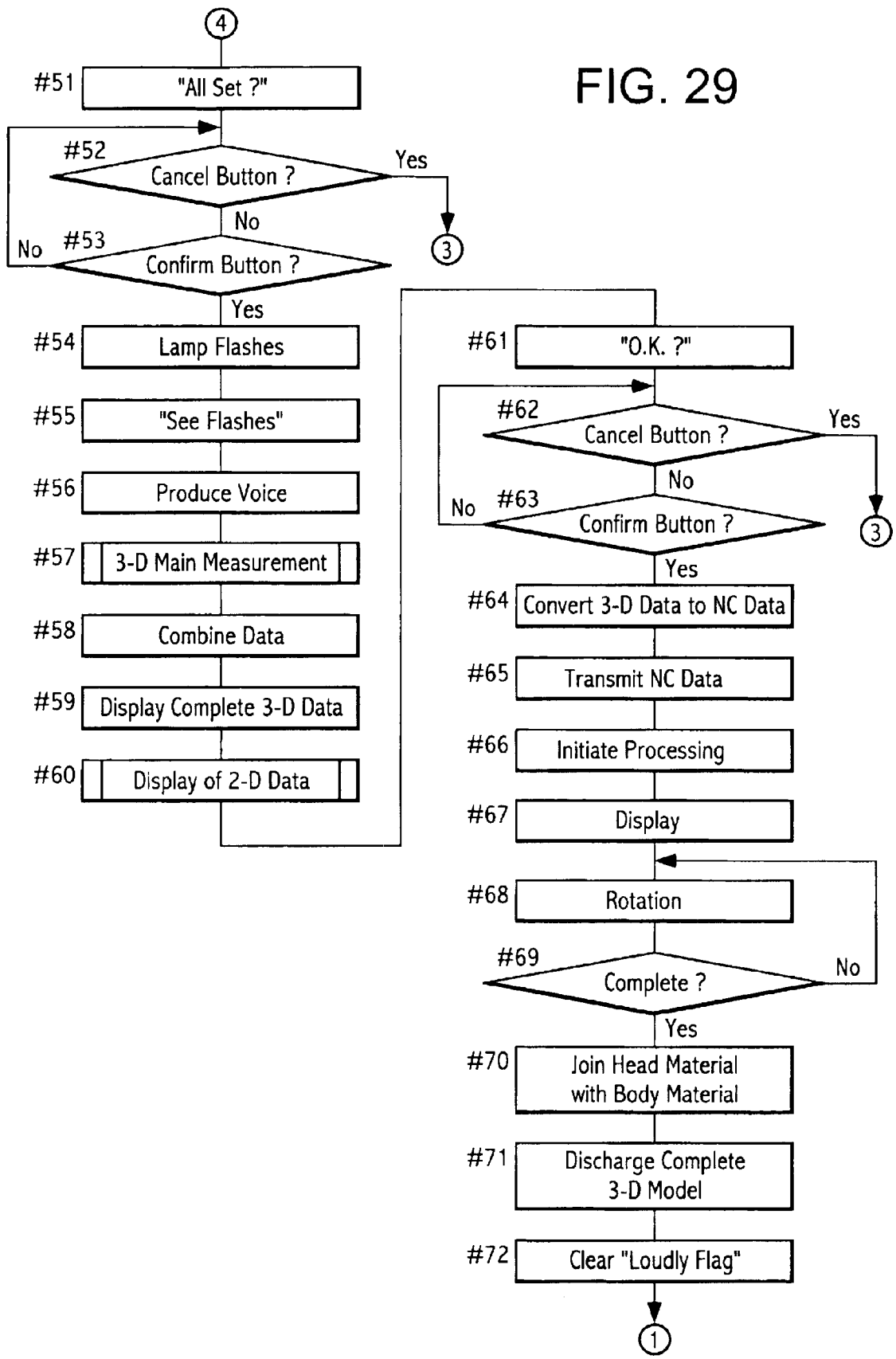
FIG. 29 is a flow chart illustrating the processing operation in the control unit.
Figure 30:
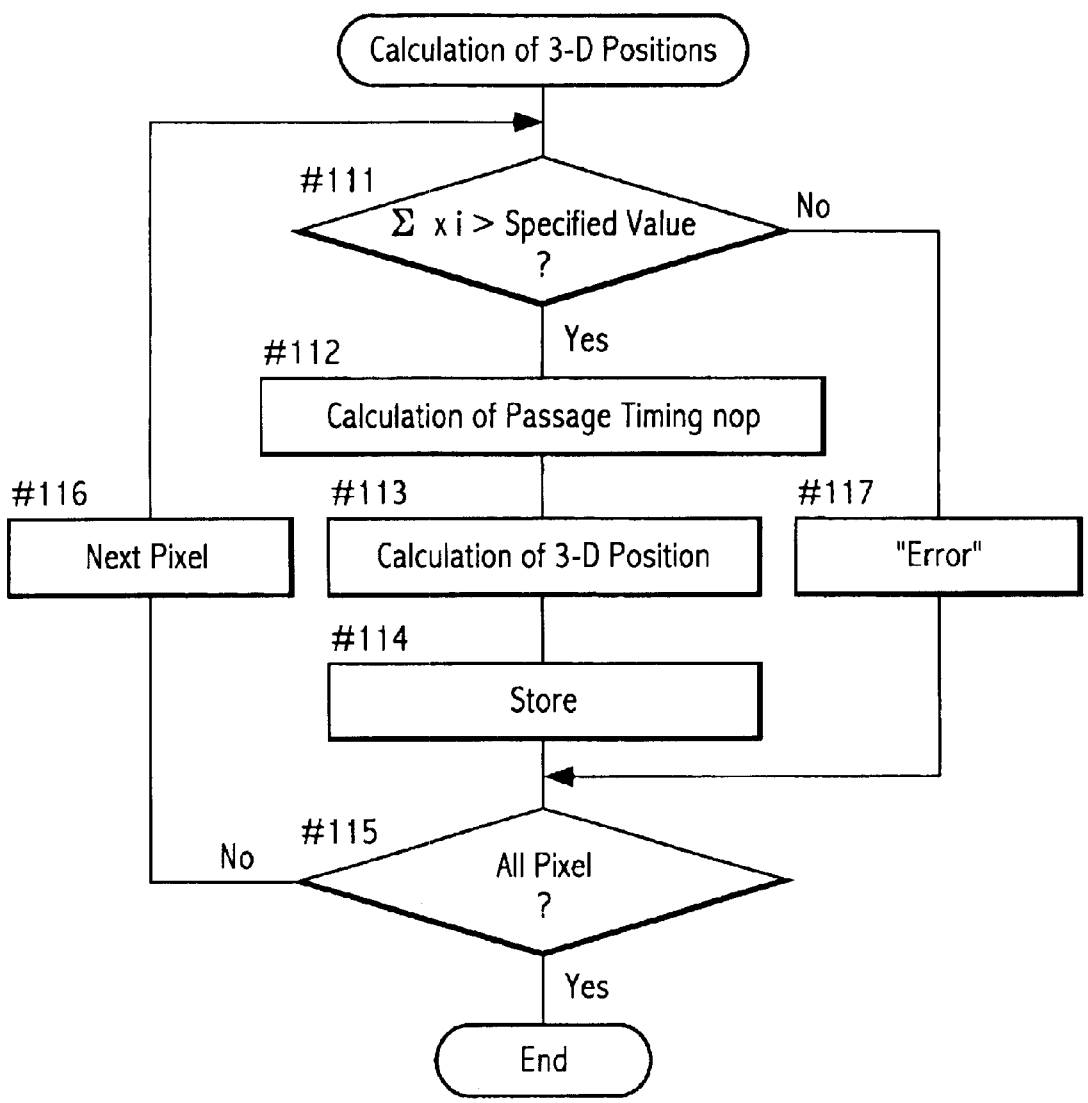
FIG. 30 is flow chart illustrating the procedure of calculating a 3-D position in the control unit.

FIGS. 27 to 29 are flow charts illustrating the processing operation performed by the control unit 12. FIG. 30 is a flow chart for illustrating the procedure of calculating a 3-D position in the control unit 12.

In FIG. 27, the control unit 12 is initialized first at power-on (#11). Then, the measuring unit 11 and the processing unit 17 are initialized with a power supply (#12). An image for attracting the user's attention is displayed as a demonstration and music is heard from the speaker 15 (#13). Instructions and cautions in operating the human body modeling apparatus 3 are also displayed and the apparatus 3 is kept in a standby state until a coin is inserted in the coin insert portion 16 (#14).

When a coin is inserted, a hair style menu is displayed on the display surface 14a (#15). The hair style menu displays a plurality of hair styles, so that the operator HM selects a preferred one therefrom by operating the operating unit 13 (#16). The reason for selecting among the ready-made hair styles is that it is not easy to obtain 3-D data from hair and processing is also difficult.

After the selection of hair style, a body menu is displayed (#17). The body menu displays a plurality of body images, so that the operator operates to select a preferred one therefrom (#18). The operator is expected to select among the ready-made body options since the face HMf is the only part of the operator HM from which 3-D data is obtained by shooting and a model is newly produced. The hair styles displayed by the hair style menu and the bodies displayed by the body menu correspond to the head materials AMh and the body materials AMb prepared in the processing unit 17.

Next, a mode menu is displayed (#19). The mode menu contains a "loud mode" and a "quiet mode." In the "loud mode," all the processes for judgment and caution are performed thereafter. The "quiet mode" allows the operator HM to shoot himself in a desired manner. Once the "quiet" mode is selected, neither judgment nor caution is made thereafter. The operator HM is expected to select either mode by operating the operating unit 13 (#20). If the "loud mode" is selected (Yes in #21), a "loud flag" is set (#22). In the case where "loud flag" is off, all the processes for judgment and caution are skipped thereafter.

Next, a selection confirm screen is displayed (#23). The selection confirm screen displays a list of selections thus far made by the operator HM. The operator HM operates the operating unit 13 in response thereto. If a cancel button 133 is pressed (Yes in #24), the whole process returns to Step #15 where a selection is made again. If a confirm button 132 is pressed (Yes in #25), the whole process advances to Step #31. If a return button of the coin insert portion 16 is pressed (Yes in #26), a coin return process is performed (#27) and the whole process returns to Step #13. It is to be noted that the number of times that a selection can be made again by pressing the cancel button 133 is limited.

In FIG. 28, data on the selected hair style is stored in a memory in Step #31 and the selected hair style is displayed on the display surface 14a. The data on the selected hair style is also transmitted to the processing unit 17 such that the head material AMh is selected based on the data. If the "loud flag" is on (Yes in #32), 3-D premeasurement is performed (#33). In the 3-D premeasurement, rough 3-D data is obtained from shooting performed by the 3-D measuring unit 111. At this stage, the process of 3-D position calculation is performed, which will be described later. The 3-D data obtained is used for the subsequent judgment, whereby it is determined whether or not various cautions are to be made.

Next, the 2-D shooting unit 112 shoots the operator HM (#34). The 2-D shooting unit 112 shoots the entire head HMh of the operator HM and a part of the body HMb to obtain 2-D data (color image data). The portion of the 2-D data representing the face HMf that has been obtained by shooting is displayed in combination with the hair style on the display surface 14a (#35).

The following steps #37 to #50 are performed only when the "loud flag" is on. If the "loud flag" is off, the whole process jumps to Step #51 (#36).

First, a distance check is performed (#37). The check is performed to judge whether or not the face of the operator HM shot has dimensions within predetermined reference limits because, if the shot face is excessively large or small, the processed head material AMh cannot be joined properly with the prototype portion ha, resulting in an artificial and unnatural look. There are two methods of judgment, of which one uses 3-D data and the other uses 2-D data. In the method using the 2-D data, the 2-D data is partitioned into the region of the operator HM and the region of the background screen 4 and the proportion of the region of the face HMf in the entire 2-D data is calculated prior to judgment. If the distance check is performed by using the 2-D data, the 3-D premeasurement can be more simplified.

If the position of the operator is too distant (Yes in #38), a caution for prompting the operator HM to "get closer" is displayed on the display screen 14a (#39). If the position of the operator is too close (Yes in #40), a caution for prompting the operator to "get further away" is displayed (#41). After displaying the caution, the whole process returns to Step #32 where shooting is performed again. In the case where the method of performing the distance check based on the 2-D data, the whole process may also be programmed to jump to Step #34.

A glass check is performed (#42). When abnormal data is detected from the periphery of the shot operator HM as a result of checking, it is judged in principle that the operator HM is wearing glasses. If the operator HM is wearing glasses (#43), a caution for prompting the operator HM to "remove the glasses" is displayed on the display surface 14a (#44).

A hair check is performed (#45). The check is performed when the 3-D measuring unit 111 cannot obtain 3-D data from hair so as to notify the operator HM of the fact that the face HMf is shaded by the hair because the shaded part of the face cannot be formed. The check is performed because, even if the 3-D data is interpolated, an artificial and unnatural look is produced in most cases. The following are the methods of checking. It is to be noted that, since the previous distance check has properly adjusted the size of the face, data of substantially equal size is expected to be received as the 3-D data on the face.

In accordance with the first method, it is judged that the face is shaded by the hair when the amount of 3-D data is extremely small. In accordance with the second method, the judgment is made when a large portion of the 3-D data is missing. In accordance with the third method, the skin color is analyzed based on the 2-D data and only the data on the hair is extracted therefrom. Since the third method allows the deficiency in the 3-D data to be expected from the 2-D data, it becomes possible to further simplify the 3-D premeasurement. If the face is shaded by the hair, it is judged that the caution should be made (Yes in #46) and a note for prompting the operator HM to sweep up the hair is displayed on the display surface 14a.

A face orientation check is performed (#45) to judge whether or not the operator HM properly faces front. This is because, since a three-dimensional model MS facing front is normally preferred, a model facing another direction results in a failure. For the judgment, the center axis of the face connecting the tip of the nose to the tip of the mouth is extracted from the 3-D data. From the position of the center axis of the face obtained from the 3-D data, it is judged whether or not the operator HM faces front or sideways. If the operator HM faces sideways, it is judged that the caution should be made (Yes in #49) and a note for prompting the operator HM to "face front" is displayed on the display surface 14a (#50). If the center axis of the face cannot be detected, it is judged that the operator HM faces front and it is judged that the caution need not be made.

In FIG. 29, "all set?" is displayed for the confirmation of selections (#51). To answer the question, the operator HM operates the operating unit 13. When the cancel button 133 is pressed (Yes in #52), the whole process returns to Step #32 where it is resumed. When the confirm button 132 is pressed (Yes in #53), a lamp provided in the vicinity of the light projecting window 20a and the light receiving window 20b flashes (#54). Then, "see flashes" is displayed on the display surface 14a (#55), while a voice is produced from the speaker 15 (#56), whereby the operator HM is prompted to see front and the face HMf is shot from a near front position.

Next, 3-D main measurement is performed (#57). In the 3-D main measurement, 3-D data is obtained through shooting performed by the 3-D measuring unit 111. In the 3-D main measurement also, the process for calculating a 3-D position, which will be described later, is performed. The head material AMh is processed based on the 3-D data obtained. The shooting may be performed either once or a plurality of times. In the case of performing the shooting a plurality of times, there can be considered various embodiments involving various shooting methods and various methods of using plural items of 3-D data obtained.

In a first example, the shooting is performed a plurality of times from the same position and the most excellent one of the plural items of data obtained, e.g., the 3-D data with the fewest missing portions is used. To perform the shooting a plurality of times, e.g., the number of shootings is set at the counter for counting the number of shootings such that the count is decremented each time the 3-D measurement is performed and the shooting is completed when the count becomes zero.

In a second example, the shooting is performed a plurality of times from the same position and only satisfactory portions of the obtained 3-D data items are selected for use. In other words, the selected portions of the 3-D data items mutually compensate for the missing portions to provide the complete 3-D data with no missing portion.

In a third example, a plurality of 3-D measuring elements 111 are disposed to shoot the face HMf of the operator HM from different angles. Plural items of 3-D data obtained are joined to each other by data processing to complete a whole item of 3-D data.

In a fourth example, a single 3-D measuring unit 111 is disposed movable to shoot the face HMf of the operator HM from different positions.

In a fifth example, a rotary table is disposed on a floor to underlie a seat for the operator HM to orient the face HMf of the operator HM to the right or left as the rotary table rotates to the right or left, whereby the face HMf of the operator HM is shot from different angles.

Next, the 3-D data obtained by shooting is combined with the hair data and the body data prepared in advance (#58). For the combination, necessary calculations are performed. The resulting complete 3-D data is stored in the characteristic data storage element 123 and displayed on the display surface 14a (#59). On the other hand, the 2-D image obtained from the foregoing hair data and body data is combined with the facial image of the operator obtained from the shooting performed in Step #57 to be displayed in conjunction with the 3-D image (#60). The process will be described later in greater detail. At the same time, "O.K.?" is displayed on the display surface 14a (#61) to receive approval from the operator HM. To answer the question, the operator HM operates the operating unit 13. If the cancel button 133 is pressed (Yes in #62), the whole process returns to Step #32 where it is resumed. If the confirm button 132 is pressed (Yes in #63), the 3-D data on the face is converted to the NC data for processing (#64). In the conversion process, a scaling factor conversion and a resolution conversion are performed and smoothing correction is performed with respect to the buffer region fpr which is a boundary portion between the face HMf and the peripheral portion. The NC data obtained from the conversion process is transmitted to the processing unit 17 (#65). In the processing unit 17, processing is initiated (#66).

The display surface 14a displays the 3-D data on the face combined with the hair data and the body data (#67), which is rotated until the processing is completed (#68). When the processing is completed (#67), the processed head material AMh is joined with the body material AMb selected and supplied for assembling(#70), so that the complete three-dimensional model MS is discharged to the discharge portion 18 (#71). Then, the "loud flag" is cleared (#72).

As shown in FIG. 30, the process of calculating a 3-D position is performed in the control unit 12, whereby the 3-D position (coordinates X, Y, Z) is calculated for each of 200×200 sampling points (pixels). Each of the sampling points corresponds to a point of intersection of the line of sight of the camera (line connecting the sampling point and the anterior principal point H) and a slit surface (the optic-axial surface of the slit light beam U with which the sampling point is irradiated).

First, it is judged whether or not the total sum Σxi of i·xi transmitted from the measuring unit 11 is over a specified value (#111). If i·xi are small, i.e., if the total sum Σxi of the slit light components is smaller than a specified standard value, numerous errors are contained so that the calculation of the 3-D position is not performed for the pixel. Data indicative of "error" is set to the pixel and stored (#117). If Σxi is over the specified value, sufficiently high accuracy is obtained so that the calculation of the 3-D position is performed.

Prior to the calculation of the 3-D position, passage timing nop for the slit light beam U is calculated (#112). The passage timing nop is calculated by calculating (Σi·xi)/(Σxi) for i=1 to 32 to obtain the gravity center (temporal gravity center Npeak) and then adding the line number to the gravity center ip.

Since the calculated gravity center ip is the timing in the 32 frames in which the output of the pixel is obtained, it is converted to the passage timing nop from the initiation of scanning by adding the line number to the gravity center ip. Specifically, the line number for a pixel in the line 32 for which calculation is performed first is "32" and the line number for a pixel in the subsequent line 33 is "33". Every time the line of the target pixel g advances by one, the line number increases by one. However, these values can be changed to other appropriate values. This is because, in calculating the 3-D position, it is possible to properly set the angle of rotation around the X axis and the angular velocity around the X axis, which are coefficients, by calibration.

Then, the 3-D position is calculated (#113). The calculated 3-D position is stored in a memory region corresponding to the pixel (#114) and the same process is performed with respect to the subsequent pixel (#116). The same process is repeatedly performed with respect to each of the pixels, whereby the whole process is completed (Yes in #115).

Figure 31:
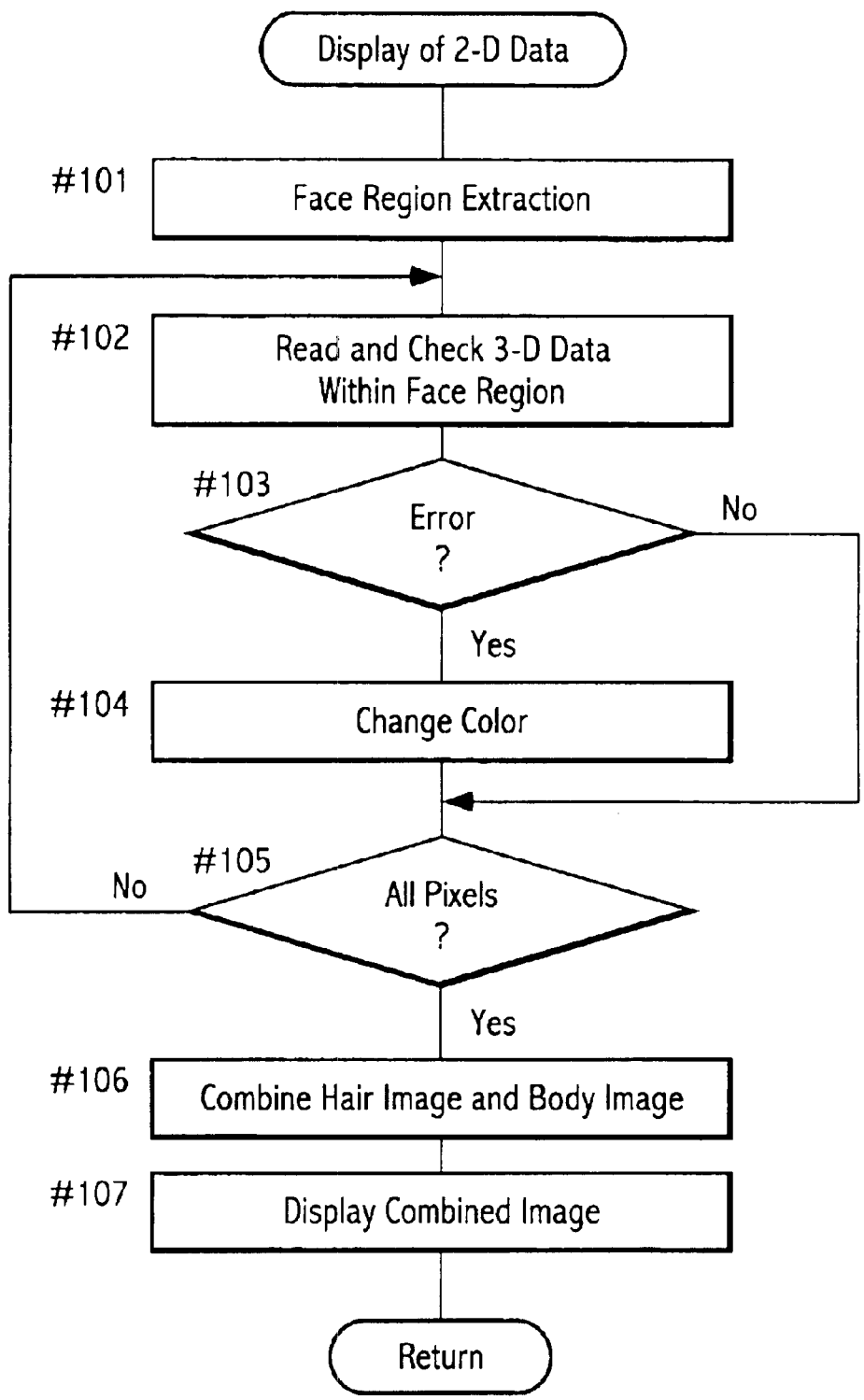
FIG. 31 is a flow chart for a first example of 2-D image display.

FIG. 31 is a flow chart for the first example of 2-D image display. In the example, the error region of the 2-D image is displayed in a specific color.

First, the face region is extracted by removing the data on the color of the background screen (#101). Since the required data is the data on the face region, only the face region is checked for whether or not it is the error region (#102). The process is performed at a high speed since the background region is not checked. In the above-described flow of FIG. 30, the error data on the pixel in which the total quantity of received light is under the specified value is stored. In short, the region shaded by the reference beam has been judged to be the error region where the quantity of received light is small. A correspondence has preliminarily been provided between each of the pixels of the 2-D image and the 3-D data. Since the present embodiment has performed the 3-D measurement and the shooting of the 2-D image from the same viewpoint, the correspondence is easily provided.

If thee pixel is contained in the error region, the image data on the pixel is changed to a specified color (#103, #104). The specified color may be a vivid color such as red or a background color (black) of the display screen. If the background color is adopted, the corresponding portion is seemingly blank.

Figure 36:
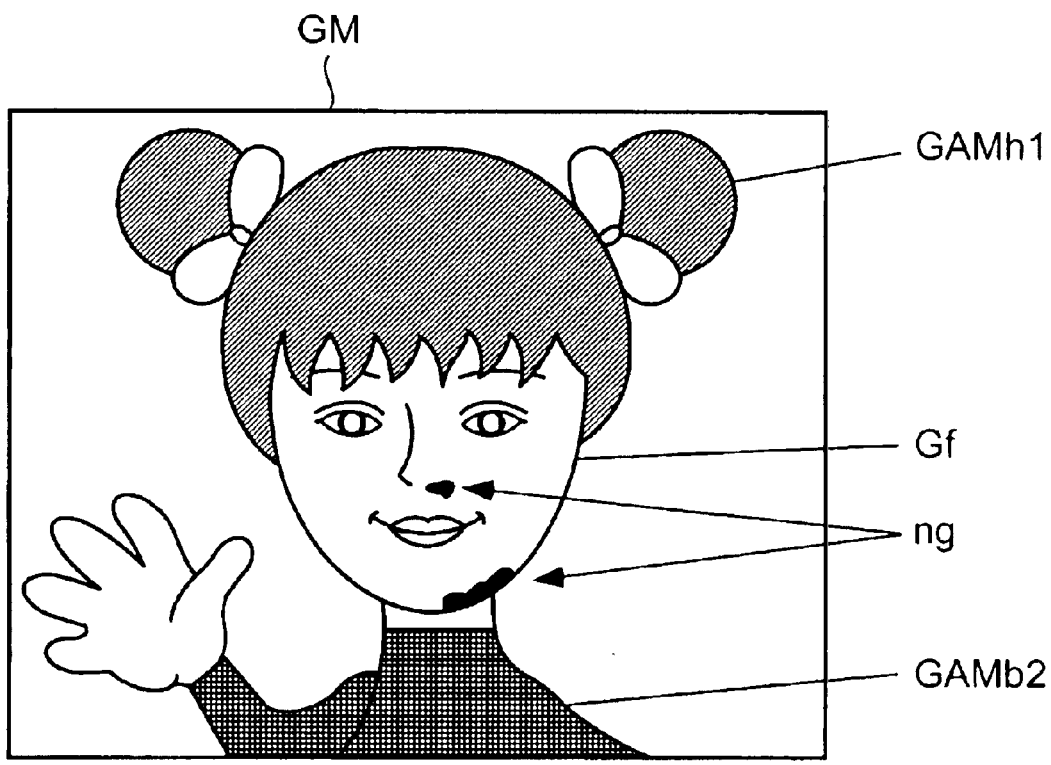
FIG. 36 is a view showing an example of a monitor image for the recognition of an error region.

When the checking of all the pixels in the face region is completed, the selected hair image GAMh1 and body image GAMb2 are combined with each other, as shown in FIG. 36, and the monitor image GM obtained is displayed (#105 to #107). In the example shown in FIG. 36, the face image Gf extracted from the 2-D shot image has respective error images ng solidly painted in the specified color under the nose and on the chin.

Figure 32:
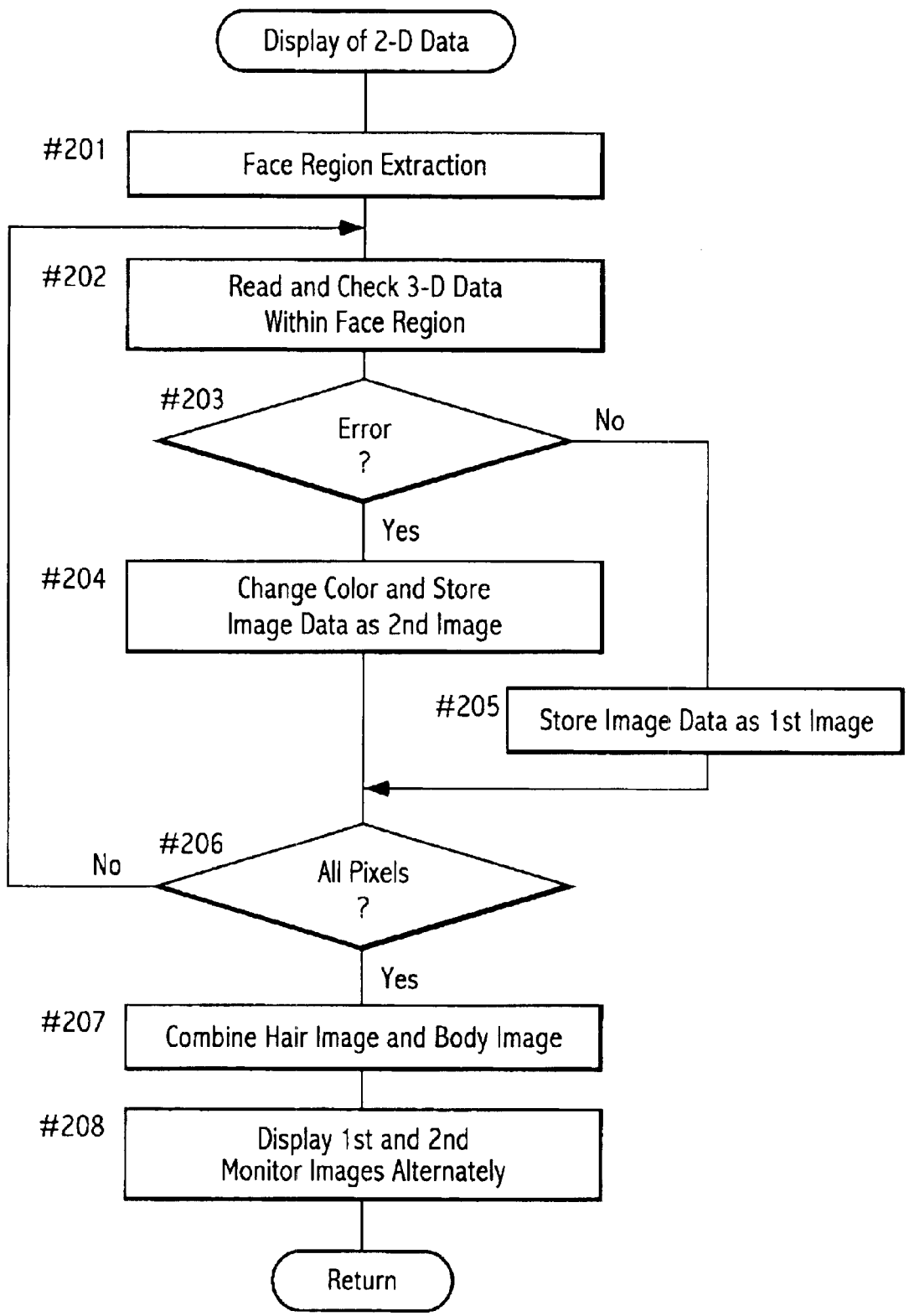
FIG. 32 is a flow chart for a second example of 2-D image display.

FIG. 32 is a flow chart for the second example of 2-D image display. In the example, the error region is caused to flash.

The face region is extracted from the 2-D image (#201), similarly to the foregoing example, and the 3-D data corresponding to the face region is read to be checked (#202). If a pixel in the face region is not contained in the error region, the image data on the pixel is stored as a first image without any alteration (#203, #205). If the pixel is contained in the error region, the image data on the pixel is changed to a specified color and stored as a second image (#203, #204).

When the checking of all the pixels in the face region is completed, the first image, the face image, and the body image are combined with each other to generate a first monitor image and the second image, the hair image, and the body image are combined with each other to generate a second monitor image (#206, #207). The first and second monitor images obtained are alternately displayed (#208), whereby the error region seemingly flashes.

Although the foregoing embodiment has positioned the background screen 4 outside of the measurable distance range and colored the background screen 3 such that it presents a low reflectance with respect to light at the wavelengths of the reference beam in order to obtain the 3-D data only on the operator HM by means of the measuring unit 11, the structures of the following variations may also be adopted.

Figure 33:
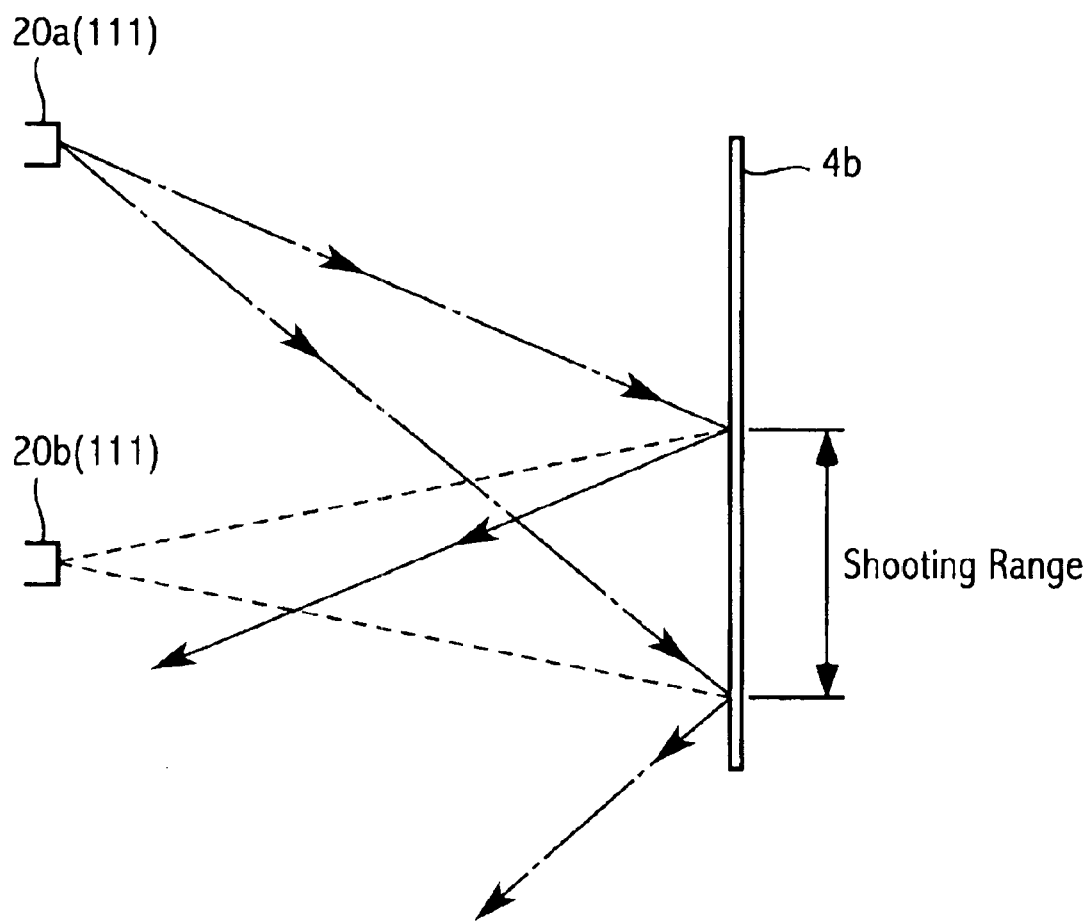
FIG. 33 is a view showing a background screen according to a first variation.

FIG. 33 is a view showing a background screen 4b according to the first variation. As shown in FIG. 33, the background screen 4b has a low diffuse reflectance with respect to the reference beam radiated from the light projecting window 20a of the 3-D measuring unit 111 and is positioned such that the reference beam directly reflected by the background screen 4b is not received by the light receiving window 20b. In such an arrangement, the reflected beam from the background screen 4b is seldom incident upon the light receiving window 20b, so that the 3-D data on the background screen 4b is not obtained. However, since the face HMf of the operator HM or the like performs sufficient diffuse reflection of the reference beam, the 3-D measuring unit 111 can provide the 3-D data by measurement. Therefore, the 3-D data only on the operator HM can be obtained if the operator HM is positioned in the shootable range.

Figure 34:
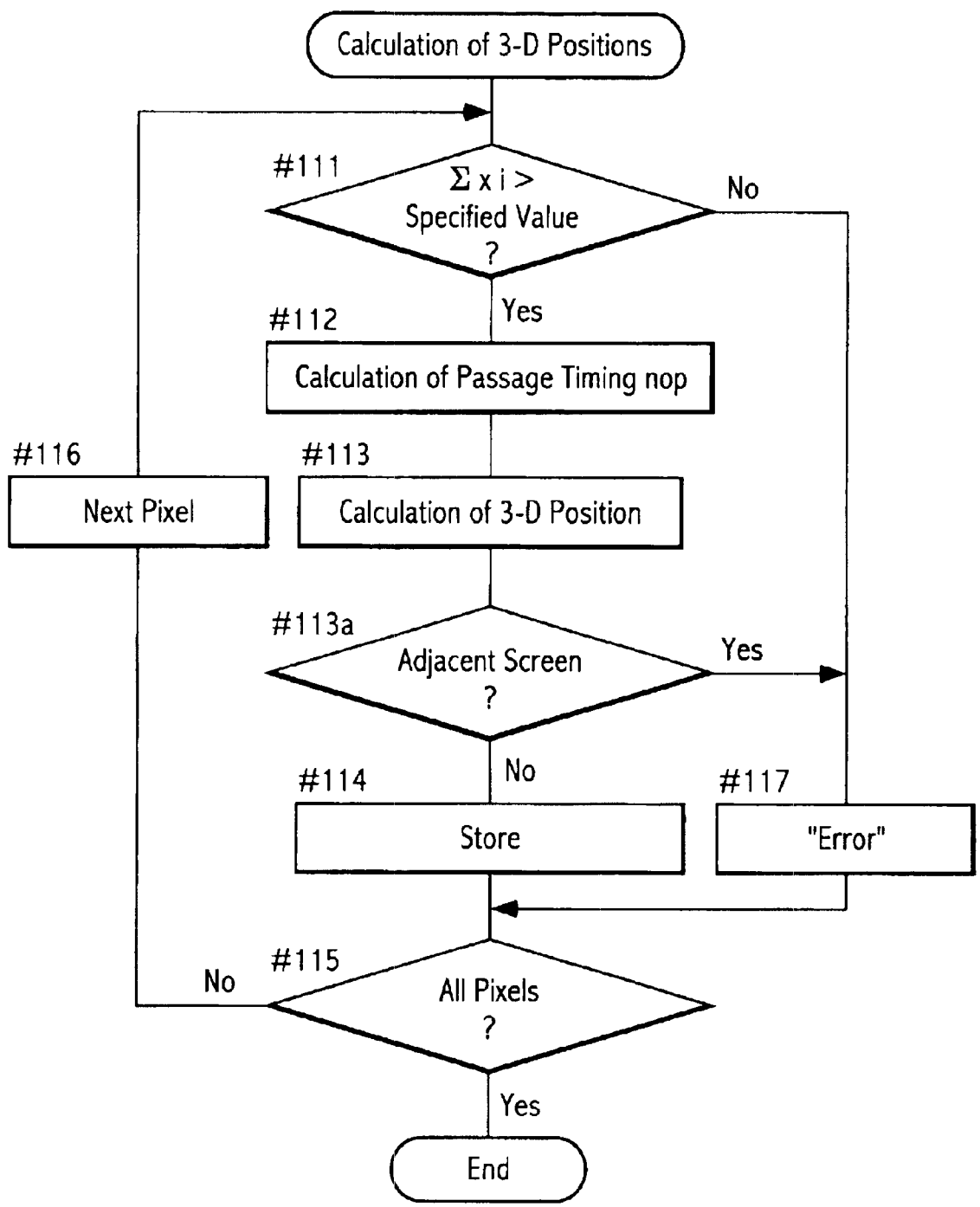
FIG. 34 is a flow chart illustrating a variation of the procedure of calculating a 3-D position in the control unit.

It is also possible to provide means for deleting, from the 3-D data obtained by the 3-D measuring unit 111, 3-D data on the vicinity of a distance position at which the background screen 4 is placed. As shown in the flow chart of FIG. 34 corresponding to the flow chart of FIG. 30, e.g., it is judged in Step #113a whether or not the 3-D position is adjacent the distance position of the background screen 4. If the 3-D position is adjacent the distance position of the screen, the whole process jumps to Step #117 where a process is performed by treating the 3-D position in the same manner as the error data is treated. The example is not limited to the active method but is also applicable to the passive method (such as stereovisual method).

In addition to coloring the background screen 4 in blue as described above, the second variation measures in advance the intensity of the reflected beam from the background screen 4 so as not to use a received light output having an intensity equal to or less than the measured intensity.

The following is a specific structure adopted for this purpose, in which an additional processing block of "screen measurement" for measuring the intensity of the reflected beam from the background screen 4 is provided subsequently to Step #12 of the flow chart shown in FIG. 27. In this case, the screen measurement process is performed after the individual components are initialized at power-on. After the screen measurement process is completed, the demonstration display is performed.

Figure 35:
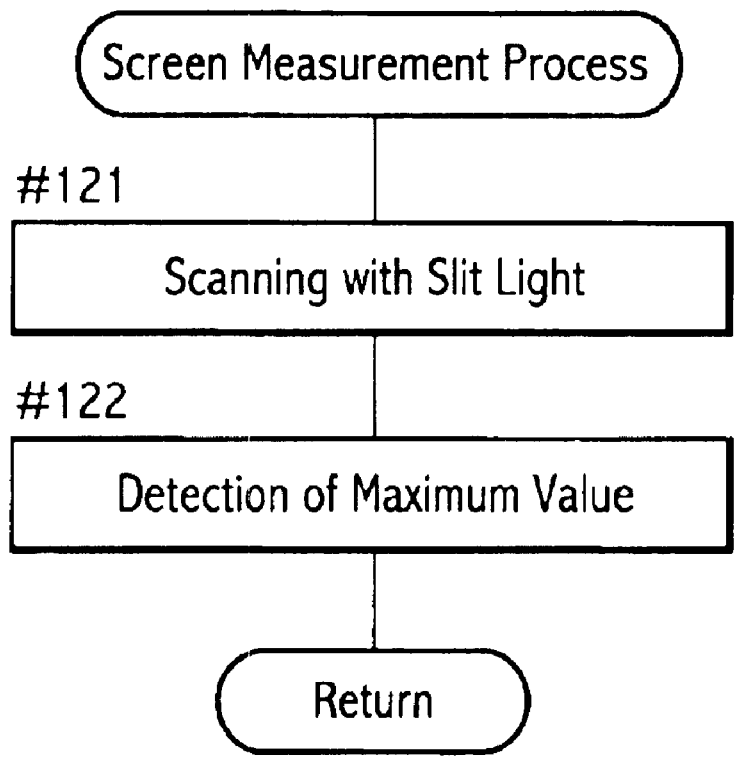
FIG. 35 is a flow chart for a screen measurement process.

FIG. 35 is a flow chart for the screen measurement process.

In the screen measurement process, the background screen 4 is irradiated and scanned with a slit light beam, similarly to normal 3-D measurement, and the reflected light beam is received (#121). The received light output is temporarily stored in the memory, whereby data as shown in FIG. 12 is stored in the memory for each pixel. From the stored data, the received light data having a maximum value is detected and the sum of the maximum-value data detected and the original fixed light data 731 of FIG. 11 are set as the fixed light data 731 (#122). The fixed light data 731 is set for each pixel. As a result, the reflected light component from the background screen 4 is cut in 3-D measurement performed thereafter. It is to be noted that, since the operator HM as the target object to be measured has a reflectance higher than that of the background screen 4, the slit light component for measurement is received in sufficient quantity.

The background screens 4, 4b include screens and walls made of various materials. For example, a screen made of woven cloth, unwoven cloth, paper, synthetic resin, synthetic rubber, or metal and a wall made of wood, earth, concrete can be used.

In the foregoing process of 2-D image display illustrated in FIGS. 31 and 32, the face region has been extracted from the 2-D data (#101, #201) and, in the extracted face region, the image data on the pixel contained in the error region has been changed to a specific color (#103, #104, #203, #204). The process steps raise the possibility that such a portion as the eyebrow, eye, or mustache becomes an error region, so that such a portion is also displayed as the error region.

However, since such portions as the eyebrow, eye, and mustache that are the regions of the face HMf other than skin are comparatively flat, an error is not so conspicuous if a hole-filling process is performed. In other words, such portions can be recovered. Nevertheless, if such portions are displayed as error regions, the error regions are included in the criteria for judgment when the operator HM judges the result of shooting the face HMf. Consequently, the operator HM may make a cancellation by pushing the cancel button 133 even if the result of shooting need not essentially be cancelled.

By contrast, a region out of the measurable distance range such as the tip of the nose or a region shadowed by the nose when the face is oriented obliquely is a skin region. In most cases, these skin regions are pointed regions such as the tip of the nose. As a result, there are cases where a region leading the pointed region abruptly becomes flat even when the hole-filling process is performed, resulting in a conspicuous error. If the skin region contains the error region, the operator HM is requested to recognize the error region as such.

If only the error regions contained in the skin region are displayed in the process of 2-D image display, it becomes possible to keep the operator HM from accidentally viewing the error region irrelevant to the operator HM.

Figure 37:
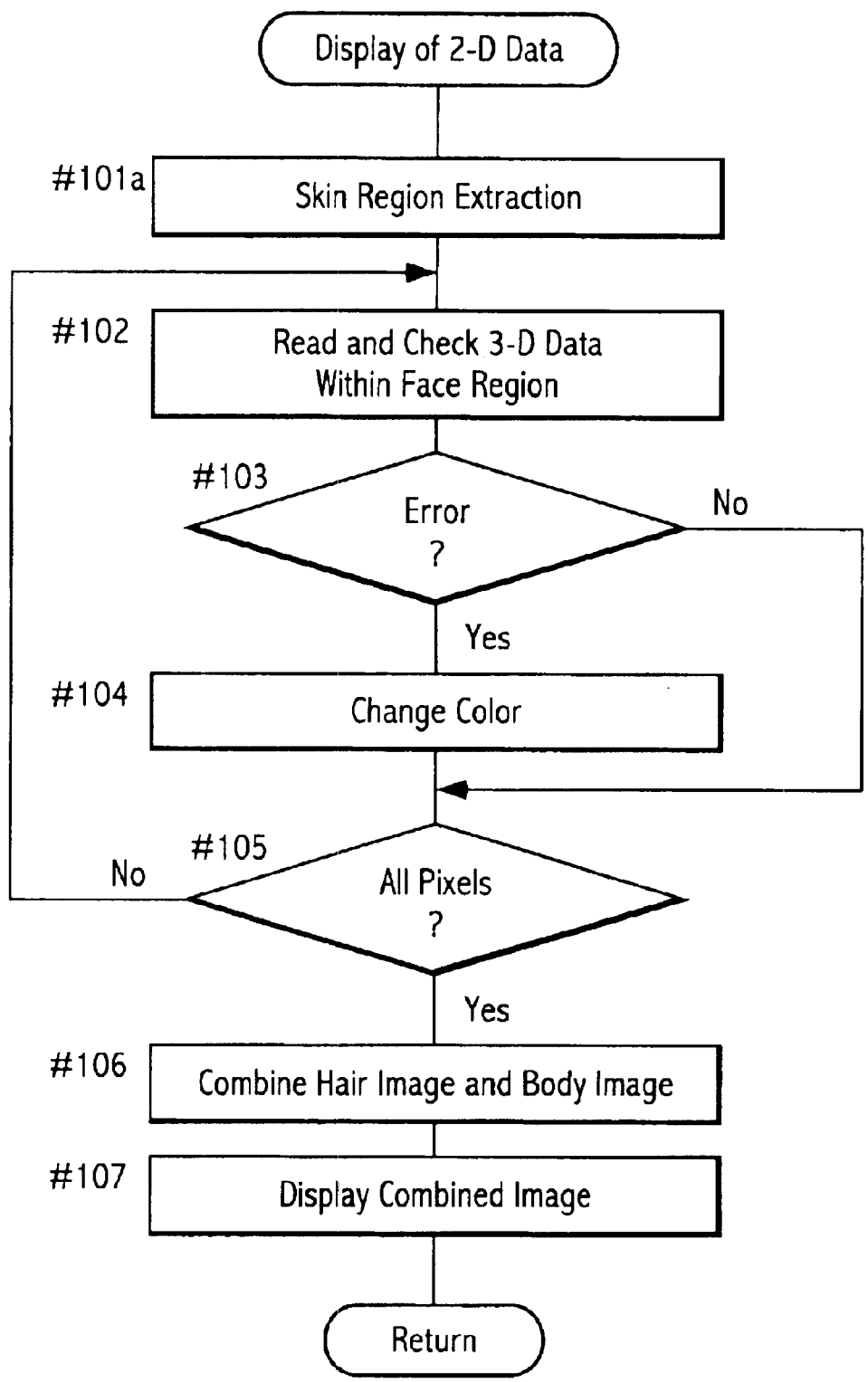
FIG. 37 is a flow chart for a third example of 2-D image display.

FIG. 37 is a flow chart for the third example of 2-D image display.

In FIG. 37, the skin region of the face is extracted from the 2-D data. In other words, not the entire region of the face but only the region obtained by removing therefrom the less reflective portions such as the eyebrows, eyes, and mustache is extracted. For the extraction, there may be adopted various methods including one in which the skin color is preliminarily held and a region corresponding to the color is recognized as a skin region and one in which the face is subjected to a 2-D Fourier transform and a region at a low frequency is recognized as a skin region. Specific image processing is performed only to the extracted skin region by the procedure subsequent to Step #102 and the monitor image GM obtained is displayed.

In the case of the flow chart shown in FIG. 37, an additional process of compensating for a data missing portion such as the eyebrow or eye by interpolation is performed in Step #58 of the flow chart shown in FIG. 29. The interpolated data is displayed in Step #67. It is also possible to perform, instead of Step #201, the same process performed in Step #101a described herein in the flow chart shown in FIG. 32.

Although the foregoing embodiment has detected error regions based on whether or not the quantity of light is under a specified standard, extracted only the skin region of the face from the 2-D data, and then judged whether or not the skin region is the error region, either the detection of the error regions or the judgment of whether or not the skin region is the error region may be performed first. The detection and judgment may also be performed simultaneously.

In the foregoing embodiment, it is also possible to further simplify the 3-D premeasurement or omit the 3-D premeasurement itself by using the 2-D data for analyzing the condition of the operator HM, i.e., for the distance check and glass check of the operator HM, and for the judgment of whether or not the face is shaded by the hair. If the 3-D premeasurement can be omitted, the life span of the 3-D measuring unit 111 is elongated accordingly, while the time required for the 3-D measurement and data processing is reduced, resulting in a reduction in overall processing time.

It is also possible to set conditions for the 3-D measurement based on the 2-D data. In that case also, the 3-D premeasurement can further be simplified or omitted. For example, the reflectance of the operator HM as a target to be measured is expected based on the 2-D data and the intensity of a laser beam is set for the 3-D measurement based on the result so that the semiconductor laser 41 is controlled based on the setting. Alternatively, the position of the operator HM is detected based on the 2-D data such that a portion which needs 3-D data measurement is extracted and set. In this case, the 3-D measuring unit 111 performs 3-D measurement only with respect to the set portion. In accordance with the present embodiment, only the portion of the face HMf or head HMh is extracted based on the 2-D data and the extracted portion is set as the region to be measured in three dimensions so 3-D measurement is performed only with respect to the portion of the face HMf or head HMh. In that case, the 3-D measuring unit 111 is properly prevented from performing scanning with the slit light beam, the reception of the beam light, and the calculation process with respect to the portion which does not need 3-D measurement.

Although the present embodiment assembles the three-dimensional model MS by joining the head material AMh with the body material AMb and sells the three-dimensional model MS as a finished product, it is also possible to sell the head material AMh and the body material AMb in the separate, unassembled state. It is also possible to sell only the processed head material AMh as the finished product of the three-dimensional model MS. The three-dimensional model MS can be used as an accessory such as a key holder, pendant, or brooch as it is or by attaching an appropriate metal part thereto.

Although the foregoing embodiment has described, by way of example, the human body modeling system 1 by assuming the use thereof as an automatic vending machine, the three-dimensional model MS produced may be distributed without charge. The size of the three-dimensional model MS is not limited to a reduced size but may be an actual size or an enlarged size. The target object to be measured may be a living thing other than a human or a non-living thing. The application of the present invention is not limited to the production of a model. The 3-D data based on which the operator determines the extent of the error region in the monitor image GM may also be used for various applications.

Although the present embodiment has used the light chopping method as the 3-D measurement method, another method may also be used instead. Although the present embodiment has used the structure in which the 3-D measurement and the shooting of the 3-D image are performed from the same viewpoint, the present invention may also use another viewpoint. As long as a major part of the 3-D measurement range can be shot, slight deviations are permissible.

What is claimed is:

1. A monitor display apparatus comprising:
a display for displaying an image;
means for recognizing, based on 3-D data obtained by measuring an object in three dimensions, an error region which is an unmeasurable portion of said object in a measured range;
means for extracting a partial image corresponding to said error region from a 2-D image obtained by shooting said object; and
display control means for displaying a monitor image representing at least the size and position of said partial image on said display.

2. The monitor display apparatus according to claim 1, wherein said display control means displays said 2-D image with said partial image being enhanced as the monitor image.

3. The monitor display apparatus according to claim 1, wherein said means for recognizing includes means for determining that a quantity of received light, means for comparing said quantity against a threshold, and means for designating a region as an error region when said determined quantity is less than said threshold.

4. The monitor display apparatus according to claim 1, wherein said means for extracting includes means for determining correspondence between said error region in said 3-D data and said 2-D image.

5. The monitor display apparatus according to claim 1, wherein said display control means includes means for changing color in said error region.

6. The monitor display apparatus according to claim 1, wherein said display control means includes means for flashing said error region.

7. The monitor display apparatus according to claim 1, further comprising means for measuring an object in three dimensions to obtain said 3-D data, wherein said measuring means includes: a non-contacting 3-D measuring unit; a 2-D imaging unit; and a measurement-system controller.

8. The monitor display apparatus according to claim 7, wherein said measuring means includes a light scanner and a light sensor.

9. A monitor display apparatus comprising:

a display for displaying an image;

means for recognizing, based on 3-D data obtained by measuring a head in three dimensions, an error region which is an unmeasurable portion of said head; and display control means for displaying, on said display, a 2-D image obtained by shooting said head after performing specific surface image processing with respect to a region thereof corresponding to skin which is also a portion corresponding to said error region.

10. The monitor display apparatus according to claim 9, wherein said display control means displays the monitor image obtained by performing specific image processing with respect to said region thereof corresponding to skin which is also a portion corresponding to said error region.

11. The monitor display apparatus according to claim 9, wherein said display control means displays said 2-D image with said region thereof corresponding to skin which is also a portion corresponding to said error region, being enhanced as the monitor image.

12. The monitor display apparatus according to claim 9, wherein said means for recognizing includes means for determining that a quantity of received light, means for comparing said quantity against a threshold, and means for designating a region as an error region when said determined quantity is less than said threshold.

13. The monitor display apparatus according to claim 9, wherein said means for extracting includes means for determining correspondence between said error region in said 3-D data and said 2-D image.

14. The monitor display apparatus according to claim 9, wherein said display control means includes means for changing color in said error region.

15. The monitor display apparatus according to claim 9, wherein said display control means includes means for flashing said error region.

16. The monitor display apparatus according to claim 9, wherein said display control means includes means for compensating for data in said error region.

17. The monitor display apparatus according to claim 9, further comprising means for measuring an object in three dimensions to obtain said 3-D data, wherein said measuring means includes: a non-contacting 3-D measuring unit; a 2-D imaging unit; and a measurement-system controller.

18. The monitor display apparatus according to claim 17, wherein said measuring means includes a light scanner and a light sensor.

19. A method of display an image, comprising:

displaying an image;

recognizing, based on 3-D data obtained by measuring an object in three dimensions, an error region which is an unmeasurable portion of said object in a measured range;

extracting a partial image corresponding to said error region from a 2-D image obtained by shooting said object; and displaying a monitor image representing at least the size and position of said partial image on said display.

20. The method according to claim 19, wherein said display step includes displaying said 2-D image with said partial image being enhanced as the monitor image.

21. The method according to claim 19, wherein said recognizing step includes determining that a quantity of received light, comparing said quantity against a threshold, and designating a region an error region as when said determined quantity is less than said threshold.

22. The method according to claim 19, wherein said extracting includes determining correspondence between said error region in said 3-D data and said 2-D image.

23. The method according to claim 19, wherein said displaying step includes displaying a 2-D image obtained by shooting said head after performing specific image processing with respect to a region thereof corresponding to skin which is also a portion corresponding to said error region.

24. The method according to claim 19, further comprising measuring an object in three dimensions to obtain said 3-D data, wherein said measuring includes measuring said object in three dimensions without contacting the object and imaging said object in two dimensions.

25. The method according to claim 24, wherein said measuring includes scanning light and sensing scanned light reflected from said object.

* * * * *